US011333588B1

(12) United States Patent
Tian et al.

(10) Patent No.: US 11,333,588 B1
(45) Date of Patent: May 17, 2022

(54) MATRIX-ASSISTED METHODS AND COMPOSITIONS TO PREPARE BIOLOGICAL SAMPLES FOR SUPER-RESOLUTION IMAGING

(71) Applicant: Nebulum Technologies Co., Ltd., Zhubei (TW)

(72) Inventors: Xuejiao Tian, New Taipei (TW); Chia-Ming Lee, Taipei (TW); Bi-Chang Chen, Taipei (TW)

(73) Assignee: Nebulum Technologies Co., Ltd., Zhubei (TW)

( * ) Notice: Subject to any disclaimer, the term of this patent is extended or adjusted under 35 U.S.C. 154(b) by 0 days.

(21) Appl. No.: 17/113,873

(22) Filed: Dec. 7, 2020

(51) Int. Cl.
*G01N 1/30* (2006.01)
*G01N 1/36* (2006.01)
*G01N 21/64* (2006.01)
*G01N 27/447* (2006.01)

(52) U.S. Cl.
CPC .............. *G01N 1/30* (2013.01); *G01N 1/36* (2013.01); *G01N 21/6428* (2013.01); *G01N 21/6458* (2013.01); *G01N 27/44747* (2013.01); *G01N 2021/6439* (2013.01)

(58) Field of Classification Search
None
See application file for complete search history.

(56) References Cited

U.S. PATENT DOCUMENTS

| | | | |
|---|---|---|---|
| 10,309,879 B2* | 6/2019 | Chen | G01N 1/36 |
| 2009/0041316 A1* | 2/2009 | Koos | G06K 9/00134 382/128 |
| 2009/0142259 A1 | 6/2009 | Gao et al. | |
| 2010/0075391 A1* | 3/2010 | Watling | G01N 1/36 435/174 |
| 2016/0258856 A1 | 9/2016 | Kim et al. | |
| 2016/0305856 A1* | 10/2016 | Boyden | G01N 1/36 |
| 2017/0199104 A1* | 7/2017 | Gradinaru | C12Q 1/68 |
| 2018/0030504 A1 | 2/2018 | Nolan et al. | |
| 2019/0064037 A1* | 2/2019 | Boyden | G01N 1/30 |
| 2019/0113423 A1 | 4/2019 | Goodman et al. | |
| 2019/0145868 A1* | 5/2019 | Chung | G01N 1/30 435/40.5 |
| 2019/0264270 A1 | 8/2019 | Zhuang et al. | |
| 2019/0276881 A1* | 9/2019 | Zhuang | G01N 1/36 |
| 2020/0041514 A1* | 2/2020 | Boyden | G01N 33/68 |
| 2020/0080139 A1 | 3/2020 | Cai et al. | |
| 2020/0388031 A1 | 12/2020 | Chiang et al. | |
| 2021/0002433 A1 | 1/2021 | Barney et al. | |
| 2021/0255072 A1* | 8/2021 | Zhao | G01N 1/312 |

FOREIGN PATENT DOCUMENTS

| | | | |
|---|---|---|---|
| WO | WO-2014025392 A1 * | 2/2014 | ....... G01N 27/44743 |
| WO | 2015048173 A1 | 4/2015 | |
| WO | 2015127183 A2 | 8/2015 | |
| WO | 2017/031249 A1 | 2/2017 | |
| WO | 2017027367 A1 | 2/2017 | |
| WO | 2017027368 A1 | 2/2017 | |
| WO | 2017/053516 A1 | 3/2017 | |
| WO | 2017147465 A1 | 8/2017 | |
| WO | 2017190101 A1 | 11/2017 | |
| WO | 2019023214 A1 | 1/2019 | |
| WO | 2019156957 A1 | 8/2019 | |
| WO | 2019199579 A1 | 10/2019 | |
| WO | 2019241662 A1 | 12/2019 | |
| WO | 2020013833 A1 | 1/2020 | |
| WO | 2020/252444 A1 | 12/2020 | |
| WO | 2021/028326 A1 | 2/2021 | |

OTHER PUBLICATIONS

Klimas et al., The Basics of Expansion Microscopy, Curr. Protoc. Cytom., (Dec. 2019), 91(1), e67 (first published Oct. 24, 2019) (Year: 2019).*
Strobl et al., Light Sheet-based fluorescence microscopy of living or fixed and stained Tribolium castaneum Embryos, Journal of Visualized Experiments, 122, (2017), (17 pages) (Year: 2017).*
Uribe et al., In vivo analysis of cardiomyocyte proliferation during trabeculation, The Company of Biologists, 145, (2018), (12 pages). (Year: 2018).*
Chen et al., Expansion Microscopy, Science, 37(6221), (2015), p. 543-548 (Year: 2015).*
Gao et al., Q&A: Expansion Microscopy, BMC Biology, 15(50), (2017) (9 pages) (Year: 2017).*
Ahmed, Hydrogel: Preparation, characterization, and applications: A review, Journal of Advanced Research, 6, (2015), p. 105-121 (Year: 2015).*
Asano et al., Expansion Microscopy: Protocols for Imaging Proteins and RNA in Cells and Tissues, Curr. Protoc. Cell Biol., 80(1), (2019) (56 pages) (Year: 2019).*
Mai et al., Use of Acridine Orange for Histologic Analysis of the Central Nervous System, The Journal of Histochemistry and Cytochemistry, 32(1), (1984), p. 97-104 (Year: 1984).*
Wong et al., Label-free automated three-dimensional imaging of whole organs by microtomy-assisted photoacoustic microscopy, Nature Communications, 8 (1386), (2017), 8 pages (Year: 2017).*
J.J. Roberts, P.J. Martens, 9—Engineering biosynthetic cell encapsulation systems, Editor(s): L. Poole-Warren, P. Martens, R. Green, In Woodhead Publishing Series in Biomaterials, Biosynthetic Polymers for Medical Applications, Woodhead Publishing, 2016, pp. 205-239 (45 pages total) (Year: 2016).*
Baddeley, et al., "Biological Insight from Super-Resolution Microsopy: What We Can Learn from Localization-Based-Images", Annual Reviews, Dec. 15, 2017, pp. 3.1-3.25.
Chen, et al., "Expansion microscopy," Science Mag., Jan. 30, 2015, pp. 543-548, vol. 347, issue 6221.
Ertürk, et al., "Three-dimensional imaging of solvent-cleared organs using 3DISCO", Protocol, 2012, pp. 1983-1995, vol. 7, issue 11.

(Continued)

*Primary Examiner* — Ellen J Marcsisin
(74) *Attorney, Agent, or Firm* — Kim IP Law Group LLC

(57) ABSTRACT

Matrix-assisted methods and compositions, including those based on solutions containing low melting agarose, to prepare intact organs and other samples for super resolution imaging by microscopy, and more particularly, lightsheet microscopy.

26 Claims, 18 Drawing Sheets

(56) References Cited

OTHER PUBLICATIONS

Chung et al., "Structural and molecular interrogation of intact biological systems", Nature, May 16, 2013, pp. 332-340, vol. 497.
Heintzmann, et al., "Breaking the resolution limit in light microscopy," Briefings in Functional Genomics and Proteomics, 2006, pp. 289-301, vol. 5, issue 4.
Maglione, et al., "Seeing the forest tree-by-tree: super-resolution light microscopy meets the neurosciences," Nature Neuroscience, 2013, pp. 790-797, vol. 16, issue 7.
Hell, et al., "Breaking the diffraction resolution limit by stimulated emission: stimulated-emission-depletion fluorescence microscopy," Optics Letters, Jun. 1, 1994, pp. 790-782, vol. 19, issue 11.
Ku, et al., "Multiplexed and scalable super-resolution imaging of three-dimensional protein localization in size-adjustable tissues", Nature Biotechnology, Sep. 2016, pp. 973-981, vol. 34, issue 9.
Karagiannis, et al., "Expansion microscopy: development and neuroscience applications," Current Opinion in Neurobiology, 2018, pp. 56-63, vol. 50.
Hirano, et al., "Recent advancements in structured-illumination microscopy toward live-cell imagining," Microscopy, 2015, pp. 1-13, vol. 0, issue 0.
Tillberg, et al., "Protein-retention expansion microscopy of cells and tissued labeled using standard fluorescent proteins and antibodies," Nature Biotechnology, 2016, pp. 1-9.
Tainaka, et al., "Chemical Landscapes for Tissue Clearing Based on Hydrophilic Reagents," Cell Reports, 2018, pp. 2196-2210, vol. 24.
Susaki, et al., "Whole-Brain Imaging with Single-Cell Resolution Using Chemical Cocktails and Computational Analysis," Cell, Apr. 24, 2014, pp. 726-739, vol. 157.
Mano, et al., "Whole-Brain Analysis of Cells and Circuits by Tissue Clearing and Light-Sheet Microscopy," The Journal of Neuroscience, Oct. 31, 2018, pp. 9330-9037, vol. 38, issue 44.
Wassie, et al., "Expansion microscopy: principles and uses in biological research," Nature Methods, 2019, pp. 33-41, vol. 16.
Ueda, et al., "Whole-Brain Profiling of Cells and Circuits in Mammals by Tissue Clearing and Light-Sheet Microscopy," Neuron, 2020, pp. 369-387, vol. 106.
Murakami, et al., "A three-dimensional single-cell-resolution whole-brain atlas using CUBIC-X expansion microscopy and tissue clearing," Nature Neuroscience, 2018, pp. 625-637, vol. 21.
Fritzsche, et al., "Cytoskeletal actin dynamics shape a ramifying actin network underpinning immunological synapse formation," Science Advances, 2017, pp. 1-18, vol. 3.
Huang, et al., "Elastic hydrogel as a sensor for detection of mechanical stress generated by single cells grown in three-dimensional environment," Biomaterials, 2016, pp. 103-112, vol. 98.
"CyGEL SustainTM (ab109205)", abcam.com, https://www.abcam.com/cygel-sustain-ab109205.html?productWallTab=ShowAll, 2011, retrieved Mar. 16, 2021, (11 pages).
Fornell, et al. "An acoustofluidic platform for non-contact trapping of cell-laden hydrogel droplets compatible with optical microscopy", Biomicrofluids, 2019, vol. 13.
Hasturk, et al., "Enzymatically crosslinked silk and silk-gelatin hydrogels with tunable gelation kinetics, mechanical properties and bioactivity for cell culture and encapsulation," Biomaterials, 2020, vol. 232.
Neves, et al., "Biofunctionalized pectin hydrogels as 3D cellular microenvironments," Journals of Materials Chemistry B, 2015, vol. 8.
Treweek, et al., "Whole-body tissue stabilization and selective extractions via tissue-hydrogel hybrids for high-resolution intact circuit mapping and phenotyping," Nature Protocols, 2015, pp. 1860-1896, vol. 10, issue 11.
Massigiani, et al., "Enhanced fluorescence imaging of live cells by effective cytosolic delivery of probes," PLoS ONE, 2010, vol. 5, issue 5.

* cited by examiner

Matrix-Assisted Expansion of Intact Organs for Super Resolution Imaging

| Organ | Before Processing | After Expansion |
|---|---|---|
| Adult mouse brain |  |  |

| Organ | Before Processing | After Expansion |
|---|---|---|
| 7-day-old mouse brain |  |  |

| Organ | Before Processing | After Expansion |
|---|---|---|
| Adult mouse kidney |  |  |

| Organ | Before Processing | After Expansion |
|---|---|---|
| 7-day old mouse kidneys |  |  |

| Organ | Before Processing | After Expansion (Portion of Liver) |
|---|---|---|
| Adult mouse liver |  |  |

| Organ | Before Processing | After Expansion |
|---|---|---|
| Adult mouse heart |  |  |

| Sample | Before Processing | After Expansion (Left Lung) |
|---|---|---|
| Adult mouse lungs |  |  |

| Sample | Before Processing | After Expansion |
|---|---|---|
| Adult mouse spleen |  |  |

| Sample | Before Processing | After Expansion |
|---|---|---|
| Adult mouse small intestines |  |  |

| Sample | Before Processing | After Expansion (Segment of large intestines) |
|---|---|---|
| Adult mouse large intestines |  |  |

| Sample | Before Processing | After Expansion |
|---|---|---|
| Adult mouse stomach |  |  |

| Sample | Before Processing | After Expansion and Staining with Acridine Orange |
|---|---|---|
| Adult mouse brain |  |  |

| Sample | Before Processing | After Expansion |
|---|---|---|
| Adult mouse brain hippocampus |  |  |

| Sample | Before Processing | After Expansion |
|---|---|---|
| Adult mouse brain hypothalamus |  |  |

MATRIX-ASSISTED METHODS AND COMPOSITIONS TO PREPARE BIOLOGICAL SAMPLES FOR SUPER-RESOLUTION IMAGING

FIELD OF INVENTION

The present invention relates to methods and compositions to prepare large biological specimens, such as intact organs, as well as organ structures and other specimens, for super resolution imaging, particularly by fluorescence microscopy, and more particularly, lightsheet fluorescence microscopy.

BACKGROUND

A major focus in biology and medicine is visualizing subcellular structures and biomolecules, such as vesicles, RNA, and proteins, in their native cellular, tissue, or organ settings. In neuroscience, for example, such visualization underlies current efforts to understand the molecules and circuits underlying brain health and disease, efforts spurred by recent advances in clearing methodologies that preserve endogenous proteins and neural connectivity in intact tissues and organs. See, e.g., Ueda et al. 2020, *Neuron* 106, 369-387; Mano et al. 2018, *J. Neurosci. Methods* 38, 9330-9337. Constraining these efforts, however, is the resolving power of conventional light microscopes, whose resolution is typically limited to a few hundred nanometers—a distance much greater than most biomolecules. Consequently, diffraction-limited microscopy is generally incapable of resolving nanoscale details in biological samples—even in conjunction with emerging clearing methods.

One approach to enable nanoscale imaging of biological samples is based on super-resolution microscopy techniques, such as photoactivated localization microscopy (PALM), stochastic optical reconstruction microscopy (STORM), and stimulated emission depletion microscopy (STED). Hell and Wichmann, 1994, *Opt. Lett.* 19, 780-72; Badderly and Bewersdorf, 2018, *Annu. Rev. Biochem.* 87, 965-989; Heintzmann and Ficz, 2006, *Brief. Funct. Genomic Proteomic* 5, 289-301. Super-resolution imaging of immunolabeled thin tissue sections, for example, has allowed visualization of minute subcellular structures in neurons, neural processes, and chemical synapses. See, e.g., Maglione and Sigrist, 2013, Nat. Neurosci. 16, 790-797. However, these techniques require expensive equipment, can be slow and complex, and are generally incompatible with thicker samples and conventional immunostaining. See, e.g. Hirano et al. 2015, *Microscopy* 64, 237-249.

An alternative approach is expansion microscopy (ExM), an emerging technology that circumvents optical diffraction limits by physically magnifying (expanding or enlarging) a biological specimen. Chen et al. 2015, Sci. 347, 543-548; for review, see Karagiannis and Boyden, 2018, *Curr. Opin. Neurobiol.* 50, 56063; Wassie et al. 2019, *Nat. Methods* 16, 33-41. ExM generally involves synthesizing a swellable polymer network (or hydrogel) throughout a biological specimen, with the polymer chains extending around and between biomolecules in the sample. During this gelling (or embedding) step, biomolecules of interest, such as proteins, nucleic acids, or associated tags or labels, can be anchored to the polymer network using commercially available cross-linking chemicals. Following gelling, the polymer-embedded sample is typically subject to homogenization to facilitate even swelling at the expansion stage. The homogenized sample can then be uniformly (isotropically) expanded in a low salt solution, water, or other solvent. Such expansion increases the distance between biomolecules of interest while preserving their spatial relationship, thereby allowing molecules that were previously too close together to be discerned using standard, diffraction-limited, fluorescence microscopy.

As originally described, ExM protocols required protease digestion to accomplish homogenization, precluding direct probing of native proteins; the protocols instead used specific labels that tagged proteins and were retained by the hydrogel scaffold after proteolysis. Numerous modifications to these protocol have since been developed. These include protein retention ExM (proExM), in which proteins, rather than labels, are cross-linked to the hydrogel for expansion. Tillberg et al. 2016, *Nat. Biotechnol.* 34, 987-992. A related approach, called magnified analysis of the proteome (MAP), preserves protein content by permeabilizing biological samples with high monomer concentrations (which minimize protein cross-linking in hydrogels) and by denaturing—rather than digesting—proteins prior to expansion. Ku et al. 2016, *Nat. Biotechnol.* 34, 873-98. These and other methods enable the visualization of expanded samples with conventionally labeled antibodies and endogenous fluorescent proteins. Other advances include expansion fluorescence in situ hybridization (ExFISH), which allows nanoscale imaging of RNA; iterative ExM (iExM), which involves physically expanding a sample multiple times to achieve extremely fine resolution; and expansion pathology (ExPATH), which allows expansion and super-resolution imaging of tissue samples that are common in human clinical and pathological settings. These and other expansion microscopy approaches are described, without limitation, in International Patent Application Publication Nos. WO 2015/127183, WO 2017/027368, WO 2017/027367, WO 2017/147435, WO 2017/190101, WO 2019/156957, WO/2019/241662, and WO 2020/013833.

Despite these advances, there remains a need for further improvements in expansion microscopy, such as increasing the efficacy and integrity of sample processing, expansion, staining, and imaging. More particularly, current methods are not readily amenable to efficient processing, expansion, and imaging of large biological specimens, such as whole organs. The current invention addresses these and other needs in the art by providing compositions and methods that among other attributes, increase the stiffness, stability and strength of expanded hydrogels, increase the speed and efficacy of staining, and increase the efficiency and reliability of imaging large intact specimens.

BRIEF SUMMARY

The disclosure provides compositions and methods useful in improving super-resolution imaging of biological samples by expansion microscopy. The biological samples can be derived from any source, such as a human or animal, and can include cells, tissues, organisms, organ structures, intact organs, as well as, for example, other specimens not readily amenable to efficient expansion and image reconstruction with existing methods. In exemplary embodiments, the biological sample is an intact organ from an animal model, in particular a rodent, and more particularly, a mouse. In other exemplary embodiments, the compositions and methods can be applied to high resolution imaging of molecules and intercellular connectivity in large samples, and more particularly, can be applied to high resolution imaging of biomolecules and neural wiring in intact brain specimens, or structures thereof, such as hippocampus, cortex, amygdala, and hypothalamus structures.

In one aspect, the compositions comprise an expansion solution comprising agarose, and more particularly, low melting (LM) agarose, for expanding biological samples embedded in a swellable material, such as a polymer hydrogel, as described further herein. In embodiments, the concentration of LM agarose in the expansion solution is about 0.35%, about 0.5%, at least 0.35%, at least 0.5%, less than 1%, or less than 0.5%. The agarose compositions provide a supporting matrix for the sample, while still allowing expansion to occur, typically by at least 4-fold in each dimension (corresponding to a 64-fold volumetric expansion). The resulting increase in stability and strength conferred by agarose can enhance sample integrity and the efficacy and speed of subsequent processing and imaging steps, especially for larger specimens that require extensive scanning, slicing, or cutting. In embodiments, the compositions comprise one or more dyes in the expansion solution, as described further herein. Including dyes in the expansion step increases the efficacy of staining, especially for large samples, and also can reduce overall sample processing time. In embodiments, the compositions can be used in any of the matrix-assisted methods to prepare an expanded biological sample for super-resolution imaging, as described further herein.

In another aspect, the compositions include a composite comprising a biological sample embedded in a swellable material (such as a hydrogel) and agarose. Such composites can be generated using the expansion solutions and methods described herein. Composites can be retained in a fully expanded state, such as in an LM agarose solution, and can be stored at a temperature above the gelling temperature of the LM agarose, for example at 37° C. Composites can also be maintained in a less expanded state, as desired or appropriate, for example, in a salt-containing solution. In embodiments, the composites are used to prepare an expanded biological sample for super-resolution imaging, as described further herein. Prior to imaging, they can also be transferred to a temperature below the LM gelling temperature to solidify the LM agarose in the expanded sample. In a particular aspect, a composite comprises an intact biological specimen and confers stability to reduce out-of-focus perturbations and other distortions during extended scanning, improving the speed and quality of super resolution imaging. Moreover, in the case of composites for which subsequent embedding in an LM agarose block can be desirable to facilitate acquisition of a fully reconstructed image—for example, one comprising a large biological sample such as rodent brain—the presence of LM agarose in the composite helps to ensure compatibility with the block.

In another aspect, the disclosure provides matrix-assisted methods to prepare an expanded biological sample for super-resolution imaging, as described further herein. In embodiments, the matrix assisted methods comprise embedding a biological sample in a swellable material, homogenizing the embedded biological sample, and expanding the homogenized and embedded biological sample.

The embedding step in any of the methods can include the use of a gelling solution to form the swellable material, which can be a swellable polymer, such as a hydrogel, as described further herein. In embodiments, the gelling solution can comprise hydrogel monomers, such as acrylamide and sodium acrylate, as well as other hydrogel precursors, such as crosslinkers, initiators, and accelerators. Prior to gelling, the sample can be perfused with, and subsequently incubated in, a fixative solution, which can include glutaraldehyde, formaldehyde, paraformaldehyde or other fixative. In embodiments, the fixative solution is free of any hydrogel monomers or other precursors.

The homogenizing step in any of the methods can comprise disrupting the sample by a mechanical, physical, chemical, biochemical or, enzymatic process, as described further herein, so that subsequent expansion can occur in a uniform, or isotropic, manner. In embodiments, homogenizing involves digesting the embedded biological sample with an enzyme, such as a protease. In other embodiments, particularly when processing large specimens, homogenizing can involve denaturing the embedded biological sample with a solution comprising a detergent, such as SDS.

The expanding step in any of the methods includes incubating the sample in any of expansion compositions described here. Accordingly, a samples can be expanded in an expansion solution with LM agarose at a concentration of about 0.35%, about 0.5%, at least 0.35%, at least 0.5%, less than 1%, or less than 0.5%. The expansion solution can also include one more dyes, such as a dyes directed to cell-selective markers, subcellular structures, cytoskeletal elements, or organelle. In embodiments, the expansion solution is incorporated in methods described herein for preparing large intact organs for high resolution imaging. In embodiments, the expansion solution can also be readily adapted in existing protocols for expansion microscopy, including those relying on chemical linkers to facilitate binding of biomolecules to a hydrogel, as well as existing protocols for preparing cell-based and tissue-based samples.

In another aspect, the methods can include additional processing steps, as disclosed herein. For example, samples can be labeled with one or more marker-specific binding partners, such as antibodies or antibody fragments. Such labeling can be carried out after fixation, after gelling, after homogenization, or after expansion. The methods can also include subsequent imaging by microscopy, including by efficient fluorescent imaging methods, such as by lightsheet microscopy. In embodiments, the methods can include, prior to imaging, transferring the expanded sample to water, and can further comprise mounting the sample on an image holder and imaging the sample in a water chamber, or mounting the sample in an LM agarose block for long term storage or subsequent slicing during imaging. The methods can further comprise imaging a layer of the agarose block containing the embedded sample, removing the imaged layer from the agarose block, and imaging an adjacent layer of the agarose block.

The methods are useful in numerous applications, which include super resolution imaging of a variety of expanded cells and tissues, such as, but not limited to, animal and human tissues, and particularly, whole tissues and intact whole organs; evaluating, diagnosing, or monitoring a disease, for example by microscopically analyzing a tissue biopsy; screening candidate therapeutic agents for their effect on a tissue in a disease state; and visualizing the distribution of genetic markers in a whole tissue or intact whole organs.

DETAILED DESCRIPTION

Figure 1:
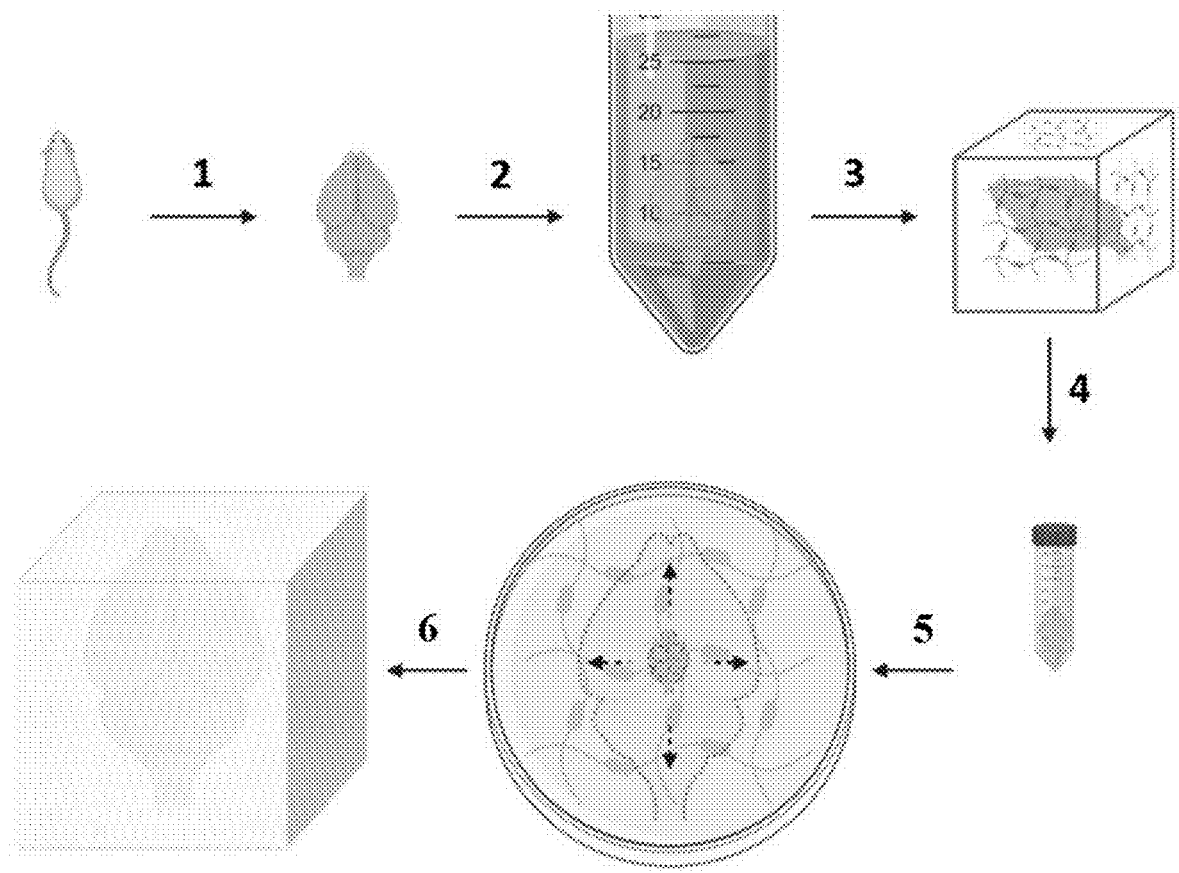
FIG. 1 is a schematic overview of a matrix-assisted protocol, in accordance with embodiments of the disclosure, to process large intact organs for super resolution imaging by expansion microscopy. The protocol can include incubating a fixed, dissected mouse brain (1) in a gelling solution (2), resulting in formation of an embedded cross-linked hydrogel (3) in the sample. The hydrogel-embedded sample can then be homogenized by denaturation in a detergent solution (4), following by expansion in an LM agarose solution (5). Post-expansion steps can include embedding the matrix-supported expanded brain in an LM agarose block prior to imaging (6).

The disclosure provides methods and compositions to prepare biological samples, especially intact organs, such as a brain, for super-resolution imaging by expansion microscopy, and more particularly, in exemplary embodiments, by expansion lightsheet microscopy. The methods and compositions can include the use of LM agarose as a supporting matrix to increase the strength of expanded samples and facilitate subsequent handling, processing, and imaging. In embodiments, as described further herein, matrix-assisted methods and compositions are useful in expanding large specimens, such as intact neural tissues, which can be subsequently imaged to visualize biomolecules and intercellular connectivity. In exemplary embodiments, samples expanded with the matrix-assisted methods and compositions maintain their three-dimensional content and subcellular organization. In other exemplary embodiments, samples, including intact large organs, expanded in the presence of LM agarose undergo at least a four-fold linear expansion that is reversible.

The invention can be more fully appreciated by reference to the following description, including the Examples. Although methods and materials similar or equivalent to those described herein can be used in the practice or testing of the present invention, suitable methods and materials are described herein. In addition, the materials, methods, and examples are illustrative only and not intended to be limiting.

For the sake of brevity, all documents, or portions of documents, cited in this application including, without limitation, patents, patent applications, articles, books, manuals, and treatises are hereby expressly incorporated by reference in their entirety for any purpose. Citation of any such publication, however, shall not be construed as an admission that it is prior art to the present application.

The use of heading and subheadings in sections of this specification is solely for organizational purposes and convenience of reference and are not to be construed as limiting the subject matter described, which are to be construed by reference to the specification as a whole.

As will become apparent to one of ordinary skill in the art after reading this document, the illustrated embodiments and their various alternatives can be implemented without confinement to the illustrated Examples Terms and Definitions Unless defined otherwise, technical and scientific terms used herein have the same meaning as commonly understood by a person of ordinary skill in the art. Any methods, devices and materials similar or equivalent to those described herein can be used in the practice of this invention. The following definitions are provided to facilitate understanding of certain terms used frequently herein and are not meant to limit the scope of the present disclosure.

As used herein, the term "about" or "approximately" means a range of values including the specified value, which a person of ordinary skill in the art would consider reasonably similar to the specified value. In embodiments, "about" means within a standard deviation using measurements generally acceptable in the art. In embodiments, "about" means a range extending to +/−10% of the specified value. In embodiments, "about" means the specified value.

It is understood that, whether the term "about" is used explicitly or not, every quantity given herein is meant to refer to both the actual given value and the approximation of such given value that would reasonably be inferred based on the ordinary skill in the art, including equivalents and approximations due to the experimental and/or measurement conditions for such given value. Accordingly, for any embodiment of the disclosure in which a numerical value is prefaced by "about" or "approximately," the disclosure includes an embodiment in which the exact value is recited. Conversely, for any embodiment of the disclosure in which a numerical value is not prefaced by "about" or "approximately", the disclosure includes an embodiment in which the value is prefaced by "about" or "approximately".

Unless indicated otherwise, concentrations provided as percentages or weight (wt) percentage refer to weight/volume (w/v) concentrations. For example, 2% or 2 wt % of a component in a 100 ml solution corresponds to 2 grams of that component.

As used herein, the terms "a," "an," and "the" are to be understood as meaning both singular and plural, unless explicitly stated otherwise. Thus, "a," "an," and "the" (and grammatical variations thereof where appropriate) refer to one or more.

Furthermore, although items, elements or components of the embodiments may be described or claimed in the singular, the plural is contemplated to be within the scope thereof, unless limitation to the singular is explicitly stated.

The terms "comprising" and "including" are used herein in their open, non-limiting sense. Other terms and phrases used in this document, and variations thereof, unless otherwise expressly stated, should be construed as open ended, as opposed to limiting. As examples of the foregoing: the term "example" is used to provide exemplary instances of the item in discussion, not an exhaustive or limiting list thereof. Adjectives such as "conventional," "normal," "known" and terms of similar meaning should not be construed as limiting the item described to a given time period or to an item available as of a given time, but instead should be read to encompass conventional, or normal technologies that may be available or known now or at any time in the future. Likewise, where this document refers to technologies that would be apparent or known to one of ordinary skill in the art, such technologies encompass those apparent or known to the skilled artisan now or at any time in the future.

As used herein, the terms "biological sample" is synonymous with "biological specimen" (and, depending on the context, "sample" or "specimen") and refers to any biological material that comprises or is believed to comprise a biomolecule, such as a nucleic acid or protein. Samples that can be manipulated with the compositions and methods provided herein can be obtained from in vivo or in vitro sources and therefore include specimens, such as cells, tissues, and organs, dissected from a subject, such as a rodent model, as well as specimens, such as cells, tissues, and mini-organs, grown in vitro. Exemplary biological specimens include solid tissues and organs, including, but not limited to, liver, spleen, kidney, lung, intestine, thymus, colon, tonsil, testis, skin, brain, heart, muscle and pancreas tissues and organs. In embodiments, the samples are whole organs obtained from an animal, including mice, rats, and other animals. In embodiments, the biological specimen is a brain tissue or a whole brain, such as from a rodent, and more particularly, a mouse. Other biological samples include cells, viruses, and other microbes. In embodiments, the biological sample is derived from a human, animal, or plant. In embodiments, samples are derived from humans, companion animals such as dogs or cats, agricultural animals such as cows, sheep and pigs, rodents such as rats or mice, zoo animals, primates such as monkeys, and the like. Other exemplary biological samples include, but are not limited to, materials derived from biopsies, bone marrow samples, organ samples, skin fragments, organisms, and materials obtained from clinical or forensic settings. In embodiments, the biological sample is a tissue sample, preferably an organ sample. The sample can be obtained from an animal or human subject affected by disease or other pathology or suspected of same (normal or diseased), or considered normal or healthy. Specimens, such as organ and tissues sample, can be collected and processed using the methods and systems described herein and subjected to microscopic analysis immediately following processing, or can be preserved and subjected to microscopic analysis at a future time, e.g., after storage for an extended period of time. In some embodiments, the methods described herein can be used to preserve tissue specimens in a stable, accessible and fully intact form for future analysis. For example, tissue specimens, such as, e.g., human brain tissue specimens, can be processed as described herein and stored for future analysis. In another example, a whole organ specimen from an animal, such as a brain, can be processed and expanded with the matrix-assisted methods and compositions described herein and be stored for future analysis.

As used herein, the term "biomolecule" is interchangeable with molecule" and refers to a molecule present in a biological sample or specimen. In one aspect, the biomolecule is an endogenous biomolecule. In another aspect, the biomolecule is an exogenous biomolecule. Non-limiting examples of an exogenous biomolecule include an artificially implanted biomolecule, e.g., one transferred or expressed by a virus or a plasmid. Biomolecules include, but are not limited to, proteins, nucleic acids, lipids, carbohydrates, steroids, metabolites, and other subcellular structures or components within a cell, tissue, or organ. Non-limiting examples of proteins include enzymes, membrane proteins, transcription factors, synaptic proteins, and neuronal markers. In some non-limiting embodiments, the biomolecule is selected from a subunit of a macromolecule, a receptor, a receptor subunit, a membrane protein, an intermediate filament protein, a membrane pump, a transcription factor, and combinations thereof. In other non-limiting embodiments, the biomolecule is Olig2 (Oligodendrocyte transcription factor), NeuN (Neuronal Nuclear Antigen), NKCC2 (Na+ K+Cl— Cotransporter 2). In other non-limiting embodiments, the biomolecule comprises an RNA. In yet other non-limiting embodiments, the biomolecule comprises a DNA. In embodiments, the biomolecule is located on a structure; exemplary structures include flagella, cilia, synapse, synaptic spines, extracellular matrix (ECM), cell wall, cell envelope, membrane, cytoplasm, Golgi Network, mitochondria, endoplasmic reticulum (ER) (e.g., rough ER or smooth ER), nucleus, centrioles, ribosomes, polyribosomes, lysosomes, liposomes, cytoskeletal component, vesicles, granules, peroxisome, vacuoles, protoplast, tonoplast, plasmodesmata plastid, chloroplast, pseudopodia a vascular-associated structure of the brain, dense astrocytic network of the brain, or combinations thereof. In embodiments, the biomolecules within the sample can be anchored to the polymer during polymerization to form a sample-polymer complex. In embodiments, the biomolecules within the sample can be anchored to the polymer after polymerization to form a sample-polymer complex. In embodiments, the biomolecules are preferentially attached to a hydrogel by incubating the sample with a high concentration of monomers to prevent or minimize intra- and inter-protein crosslinking.

As used herein, the term "staining" refers to any technique and reagent that is now known or discovered in the future that can provide a signal-based indication of the presence or absence of a particular target moiety within a sample of the disclosures. In some embodiments, the disclosed methods improve staining the efficacy of staining. Non-limiting examples of the staining agent include a small molecule, dye, an antibody, an enzyme, nanoparticles, a nucleic acid probe, or combinations thereof. In some non-limiting embodiments, the staining agent comprises a label, for example, a chromogenic label, a fluorescent label, a radionuclide-conjugated label, or combinations thereof.

Agarose is a linear polymer, generally obtained from certain types of red seaweed (e.g., Gelidium and Gracilaria), with a molecular weight of about 120,000. The agarose polymer consists of alternating D-galactose and 3,6-anhydro-L-galactopyranose linked by α-(1→3) and β-(1→4) glycosidic bonds. The 3,6-anhydro-L-galactopyranose is an L-galactose with an anhydro bridge between the 3 and 6 positions, although some L-galactose units in the polymer may not contain this bridge. Some D-galactose and L-galactose units can be methylated, and pyruvate and sulfate are also found in small quantities. Rafael Armisen; Fernando Galatas. "Chapter 1—Production, Properties and Uses of Agar," http://www.fao.org/3/x5822e/x5822e03.htm Low melting (LM) agaroses are commercially available, and are the result of chemical derivatization processes known in the art, such as hydroxyethylation, which reduces the number of intra-strand hydrogen bonds present in standard agarose, thereby resulting in relatively lower melting and gelling temperatures. LM agarose generally has several properties including: (i) relatively lower melting and gelling temperatures when compared with standard agaroses; and (ii) a higher clarity (gel transparency) compared with standard agarose gels.

In certain exemplary embodiments, the LM agarose is a molecular biology grade LM agarose having a gelling temperature ≤30° C. (e.g., 26° C.–30° C.), and/or a melting temperature ≤65° C. (both at 1.5 wt % conc.), and/or a gel strength (at 1 wt % conc.) ≥200 g/cm$^2$, which can produce gels with greater sieving properties and higher clarity than normal melting agarose. Examples of commercially available LM agaroses suitable for use in accordance with the present disclosure include, but are not limited to, SeaPrep™ agarose (Lonza Catalog #50302), SeaPlaque™ Agarose (Lonza Catalogue #50104) and UltraPure™ Low Melting Point Agarose (ThermoFisher Scientific Catalog #16500500).

In embodiments, the staining agent comprises a small molecule that is capable of binding to a particular target moiety within the tissue. Examples of small molecule dyes include DAPI, propidium iodide, lectin, phalloidin, and any other small molecule that can bind to a target moiety within the tissue. In embodiments, the small molecule inherently produces a signal, such as a fluorescence signal produced by DAPI, propidium iodide, or acridine orange. In embodiments, the small molecule is conjugated to an indicator to produce a signal, such a fluorescence signal producing indicator, e.g., in the case of a lectin dye, or a non-fluorescent signal producing indicator, e.g., a colorimetric indicator (e.g., horseradish peroxidase (HRP) or 3,3'-diaminobenzidine tetrahydrochloride (DAB)). In embodiments, the staining agent comprises an antibody, as described further herein. In embodiments, staining comprises modified nucleic acid strand-targeted detection activities. In other embodiments, staining comprises in situ hybridization such that the stain comprises a nucleotide-based probe capable of hybridizing to a predetermined sequence of nucleic acids within the tissue. In embodiments, the nucleotide-based probe comprises a label (e.g., one or more of the labels provided above) to enable signal production and detection of the nucleotide-based probe. In further embodiments, the nucleotide-based probe comprises a fluorescent label, as in fluorescent in situ hybridization (FISH).

In embodiments, the biological sample, such as a cell, tissue, organ, organism, or organ substructure, provides an endogenous signal, e.g., an endogenously fluorescent molecule. Examples of the endogenously fluorescent molecule include a fluorescent protein reporter (e.g., green fluorescent (GFP), red fluorescent protein (RFP)). In other embodiments, the sample is derived from a transgenic model, and the fluorescent molecules are expressed by a constitutive or an inducible promoter. In yet other aspects, the organism is infected with a recombinant virus or transfected with a plasmid encoding the fluorescent protein. Exemplary fluorescent protein reporters include: green fluorescent (GFP), EGFP (enhanced GFP), BFP (Blue fluorescent protein), CFP (cyan), red fluorescent protein (RFP), wtGFP (White GFP), YFP (yellow fluorescent protein), dsRed, mCherry, mVenus, mCitrine, tdTomato, Luciferase, etc.

In embodiments, the antibody is a primary antibody comprising a label that directly or indirectly produces a signal, such as a biotin label, a fluorescent label (fluorophore), an enzyme label (e.g., HRP or DAB), a coenzyme label, a chemiluminescent label, or a radioactive isotope label. In other aspects, the primary antibody is applied as the single stain (e.g., with or without additional reagents, such as a labeled streptavidin or an enzyme/coenzyme substrate to provide a signal). In embodiments, the primary antibody does not comprise a label and is instead detected by secondary antibody conjugated to a label.

Example of fluorophores that can be attached to primary or secondary antibody include: Alexa Fluor 350, Alexa Fluor 405, Alexa Fluor 488, Alexa Fluor 532, Alexa Fluor 546, Alexa Fluor 555, Alexa Fluor 568, Alexa Fluor 594, Alexa Fluor 647, Alexa Fluor 680, or Alexa Fluor 750. Other exemplary fluorophores include BODIPY FL, Coumarin, Cy3, Cy5, Fluorescein (FITC), Oregon Green, Pacific Blue, Pacific Green, Pacific Orange, Tetramethylrhodamine (TRITC), Texas Red, APC-eFluor 780, eFluor 450, eFluor 506, eFluor 660, PE-eFluor 610, PerCP-eFluor 710, Super Bright 436, Super Bright 645, Super Bright 702, Super Bright 780, Super Bright 600, Qdot 525, Qdot 565, Qdot 605, Qdot 655, Qdot 705, Qdot 800, R-phycoerythrin (R-PE), and Allophycocyanin (APC).

In embodiments, the sample is processed a microscopy-based application. Examples of the microscopy-based application include immunofluorescence, confocal microscopy, two-photon microscopy, super-resolution microscopy, light-sheet microscopy, etc.

Compositions

Expansion Solutions

The disclosure provides, in part, a composition comprising agarose, and more particularly, LM agarose, for use in expanding a biological specimen for high resolution imaging by expansion microscopy, i.e. an expansion solution.

In embodiment, the composition comprising agarose, and more particularly, LM agarose, is a liquid composition, i.e. a liquid expansion solution. In embodiments, the expansion solution is an aqueous liquid, such as a low salt solution or water, comprising LM agarose. The LM agarose not only provides a supporting matrix for the expanded sample, but it also has high clarity, allowing expanded samples to attain a refractive index essentially equivalent to water. This eliminates the requirement of hydrophilic or hydrophobic refractive index (RI) matching solution (and customized lenses) for imaging—as required in other methods. In exemplary embodiments, the compositions are used in methods of expansion microscopy to image intact whole organs, including rodent organs, such as kidney, liver, heart, lungs, or brain, as well as substructures, such as brain hypothalamus or hippocampus.

In embodiments, the concentration of LM agarose in the expansion solution is less than 1%, less than 0.9%, less than 0.8%, less than 0.7%, less than 0.5%, less than 0.4%, less than 0.3%, less than 0.2%, or less than 0.1%. In embodiments, the concentration of LM agarose in the expansion solution is at least 1%, at least 0.9%, at least 0.8%, at least 0.7%, at least 0.5%, at least 0.4%, at least 0.35%, at least 0.3%, at least 0.25%, at least 0.2%, or at least 0.1%. In embodiments, the concentration of LM agarose is about 0.1%, about 0.9%, about 0.8%, about 0.7%, about 0.5%, about 0.4%, about 0.35%, about 0.3%, about 0.25%, about 0.2%, or about 0.1%. In other exemplary embodiments, the concentration of LM agarose is between 0.1% and 1%, between 0.1% and 0.9%, between 0.1% and 0.8%, between 0.1% and 0.7%, between 0.1% and 0.6%, between 0.2% and 1%, between 0.2% and 0.9%, between 0.2% and 0.8%, between 0.2% and 0.7%, between 0.2% and 0.6%, between 0.3% and 1%, between 0.3% and 0.9%, between 0.3% and 0.8%, between 0.3% and 0.7%, or between 0.3% and 0.6%.

In embodiments, the expansion solution further comprises a dye, label, stain, or combination thereof. In embodiments, the expansion solution is used for immunofluorescence staining, which relies on the specificity of antibodies to their antigens to target fluorescent dyes to specific biomolecule targets within a cell. Such staining therefore allows light microscopy to detect the fluorescent signals and image the distribution of target molecule throughout the sample. Similarly, fluorescent dyes are typically fluorophores conjugated to chemical compounds having specificity for biomolecule targets. In embodiments, the dye can bind to a subcellular component, such as a protein, nucleic acid, steroid, lipid, or carbohydrate. In embodiments, the dye is directed to a subcellular structure, cytoskeletal features, or an organelle, such as the endoplasm reticulum (ER), Golgi apparatus, peroxisome, lysosome, mitochondria, nucleus or nucleolar region, or chloroplasts in plant samples. Exemplary dyes include, without limitation, Lectin-488, Lectin-568, and Lectin 649 (proteins), 4',6-diamidino-2-phenylindole or DAPI (dsDNA); Propidium Iodide (dsDNA), and Acridine Orange (dsDNA, ssDNA, and RNA). In embodiments, the dye or stain is water soluble.

In embodiments the solution is stored at a temperature above the gelling point of LM agarose, for example at 37° C.

In embodiments, the solution, when used in the methods herein, allows an embedded sample to expand 2-fold, 3-fold, 4-fold or more in three dimensions. Thus the sample can be increased 8-fold, 27-fold, 64-fold, or even more in volume. In embodiments, the solution allos the sample to expand uniformly (or isotropically).

Composites

The disclosure also provides, in part, an expanded biological sample comprising an embedded hydrogel and LM agarose. In embodiments, the expanded sample can include less than 1%, less than 0.9%, less than 0.8%, less than 0.7%, less than 0.5%, less than 0.4%, less than 0.3%, less than 0.2%, or less than 0.1% LM agarose. In embodiments, the expanded sample can include at least 1%, at least 0.9%, at least 0.8%, at least 0.7%, at least 0.5%, at least 0.4%, at least 0.35%, at least 0.3%, at least 0.25%, at least 0.2%, or at least 0.1% LM agarose. In embodiments, the sample is an organ, tissue, cell, or microbe, as described herein here. In embodiments the sample is a whole organ from an animal. In embodiments, the whole organ is a brain. In embodiments, the animal is a rodent, such as a mouse or rat.

In embodiments, the expanded biological sample comprises an embedded hydrogel and embedded LM agarose and further comprises a dye. In embodiments, the dye is directed to a subcellular component, such as a protein, nucleic acid, steroid, lipid, or carbohydrate. In embodiments, the dye can bind to a subcellular structure or organelle, such as the cytoskeleton, or an organelle, such as the endoplasm reticulum (ER), Golgi apparatus, peroxisome, lysosome, mitochondria, nucleus or nucleolar region, or chloroplasts in plant samples. Exemplary dyes include, without limitation, Lectin-488, Lectin-568, and Lectin 649 (proteins), 4',6-diamidino-2-phenylindole or DAPI (dsDNA); Propidium Iodide (dsDNA), and Acridine Orange (dsDNA, ssDNA, and RNA).

In embodiments, the expanded sample is formed by immersing a hydrogel-embedded sample in an expansion solution, as described herein. Accordingly, in embodiments, an expanded hydrogel sample can also include one or more dyes, as described herein.

Methods

The disclosure provides, in part, methods for generating an expanded biological sample (or specimen). In general, the steps in the methods are used to carry out isotropic (uniform) expansion of the biological sample and they can depend on the characteristics of the sample, such as the properties of the sample, e.g., a section, solid tissue, or intact organ) and the conditions used to anchor or associate different biomolecules with a hydrogel of the sample.

In embodiments, the methods for expanding a biological sample include incubating the sample in an expansion solution described herein. In embodiments, the methods comprises (a) permeating a biological sample with a gelling composition to produce a swellable material; (b) homogenizing the biological sample; and (c) incubating the biological sample with an expansion solution comprising LM agarose to swell the swellable material and generate the expanded biological sample.

Gelation

In embodiments, methods of the present disclosure comprise embedding the sample in a swellable materials. In embodiments, "embedding" the sample in a swellable material comprises permeating (such as perfusing, incubating, immersing, infusing, soaking, adding, or contacting) a biological sample with a gelling composition (or gelling solution) to produce a swellable material.

As used herein, the term "swellable material" generally refers to a material that expands when contacted with a liquid, such as water or other solvent. In embodiments, the swellable material expands uniformly (isotropically) in three dimensions when incubated in an expansion solution as disclosed herein. Additionally or alternatively, the material is transparent such that, upon expansion, light can pass through the sample.

In embodiments, the swellable material is a swellable polymer of hydrogel, which generally refers to a three dimensional network of hydrophilic polymers that can swell in water and hold a large amount of water while maintaining the structure due to chemical or physical cross-linking of individual polymer chains. In embodiments, the hydrogel is a homopolymeric hydrogel. In embodiments, the hydrogel is a copolymeric hydrogel. In embodiments, the hydrogel is a multipolymer interpenetrating hydrogel. In embodiments, the hydrogel is a polyelectrolyte hydrogel, and more particularly, a polyacrylate hydrogel.

In embodiments, the swellable material is formed in situ from precursors in the gelling compositions. For example, the gelling composition can comprise one or more hydrogel precursors, such as polymerizable materials, monomers or oligomers, including monomers selected from the group consisting of water soluble groups containing a polymerizable ethylenically unsaturated group. Monomers or oligomers can comprise one or more substituted or unsubstituted methacrylates, acrylates, acrylamides, methacrylamides, vinylalcohols, vinylamines, allylamines, allylalcohols.

In embodiments, the gelling composition includes a crosslinker, which can stabilize the subsequent polymer backbone in a hydrogel. In embodiments, the cross linker is a divinyl crosslinker, e.g., an N, N-alkylenebisacrylamide, such as N,N-methylenebisacrylamide (bis-acrylamide). In embodiments, bis-acrylamide is present at a concentration of at least 0.01%, at least 0.05%, at least 0.1%, at least 0.15%, at least 0.2%, at least 0.25%, at least 0.3%, and at least 0.35%, at least 0.4%, at least 0.45%, at least 0.5%, or at least 1%. In embodiments, bis-acrylamide is present at a concentration of about 0.05%, about 0.1%, about 0.15%, about 0.2%, about 0.25%, about 0.3%, or about 0.35%.

In embodiments, the hydrogel is a densely cross-linked polymer network is synthesized through the specimen, so that it permeates throughout the cells and between and around the biomolecules and any labels.

Precursors can also comprise a polymerization initiator, which generally refers to reagents that react with a monomer to form an intermediate compound capable of linking successively with a large number of other monomers into a polymeric compound (e.g., ammonium persulfate (APS), di-tert-butyl peroxide (DTBP), benzoyl peroxide (BPO), methyl ethyl ketone peroxide (MEKP), acetone peroxide, and VA-044 (2,2'-azobis[2-(2-imidazolin-2yl)propane]dihydrochloride); a polymerization accelerator, which generally refers to reagents that stabilize the polymerization initiator and catalyze the polymerization process (e.g., N,N,N,N'-Tetramethylethylenediamine (TEMED), inhibitors (e.g., 4-hydroxy-TEMPO; 4HT or TEMPOL), buffers, salts, crosslinkers (e.g., N,N'-Methylenebisacrylamide), and other components, as are known to one skilled in the art and described, for example, in WO2019023214 and WO/2020/013833. In embodiments, the gelling composition comprises about 0.5% of an initiator. In embodiments, the gelling solution comprises about 0.5% of an initiator and about 0.2% of an accelerator.

In embodiment, the gelling composition can comprise a solution of hydrogel subunits, including monomers and crosslinkers. In embodiments, the hydrogel subunits are acrylamide, sodium acrylate, bis-acrylamide or other acrylic monomers.

Accordingly, in embodiments, step (a) further comprises incubating the sample with a gelling composition that includes polymerizable monomers, and polymerizing the composition within the sample to produce the swellable material. In embodiments, the concentration of hydrogel monomers ranges from 5-80%, 5-70%, 5-60%, 5-50%, 5-40%, 5-30%, 5-20%, or 5-15%, 10-80%, 10-70%, 10-60%, 10-50%, 10-40%, 10-30%, 10-20%, or 10-15% (w/v). In embodiments, the concentration of monomer is 15%-20%.

In embodiments, the polymerizable monomers comprise sodium acrylate and acrylamide monomers. In embodiments, the concentrations of sodium acrylate monomers and acrylamide monomers are in a ratio of about 1:1, about 2:1, about 3:1, about 4:1, about 5:1, about 6:1, about 7:1, about 8:1, about 9:1, about 10:1, or greater than about 10:1 (e.g., 50:1). In embodiments, the concentrations of sodium acrylate monomers and acrylamide monomers are in a ratio of about 1:2, about 1:3, about 1:4, about 1:5, about 1:6, about 1:7, about 1:8, about 1:9, about 1:10, or less than 1:10 (e.g., 1:50).

In embodiments, the concentration of sodium acrylate in the gelling solution is about 1-40%, about 5-40%, about 10-40%, about 15-40%, about 20-40%, about 1-30%, about 5-30%, about 10-30%, about 15-30%, about 20-30%, about 1-20%, about 5-20%, about 10-20%, about 15-20%, about 10%, about 11%, about 12%, about 13%, about 14%, about 15%, about 16%, about 17%, about 18%, about 19%, or about 20%.

In embodiments, the concentration of acrylamide in the gelling solution is about 1-40%, about 5-40%, about 10-40%, about 15-40%, about 20-40%, about 1-30%, about 5-30%, about 10-30%, about 15-30%, about 20-30%, about 1-20%, about 5-20%, about 10-20%, about 15-20%, about 1-10%, about 3-10%, about 4-10%, about 5-10%, about 1-5%, about 1%, about 2%, about 32%, about 4%, about 5%, about 6%, about 7%, about 8%, about 9%, or about 10%.

In embodiments, the concentration of sodium acrylate in the gelling solution is about 1-40%, about 5-40%, about 10-40%, about 15-40%, about 20-40%, about 1-30%, about 5-30%, about 10-30%, about 15-30%, about 20-30%, about 1-20%, about 5-20%, about 10-20%, about 15-20%, about 10%, about 11%, about 12%, about 13%, about 14%, about 15%, about 16%, about 17%, about 18%, about 19%, or about 20%; and the concentration of acrylamide in the gelling solution is about 1-40%, about 5-40%, about 10-40%, about 15-40%, about 20-40%, about 1-30%, about 5-30%, about 10-30%, about 15-30%, about 20-30%, about 1-20%, about 5-20%, about 10-20%, about 15-20%, about 1-10%, about 3-10%, about 4-10%, about 5-10%, about 1-5%, about 1%, about 2%, about 32%, about 4%, about 5%, about 6%, about 7%, about 8%, about 9%, or about 10%.

In embodiments, the concentration of sodium acrylate in the gelling solution is about 10-20%; and the concentration of sodium acrylate in the gelling solution is about 1-10%; the concentration of sodium acrylate in the gelling solution is about 10-20%, and the concentration of sodium acrylate in the gelling solution is about 1-5%; or the concentration of sodium acrylate in the gelling solution is about 16%, and the concentration of sodium acrylate in the gelling solution is about 4%.

In embodiments, the gelling solution further comprises a polymerization initiator, such as ammonium persulfate (APS), or the temperature dependent initiator (VA-044).

In embodiments, the biological sample is first incubated in the gelling solution at 4° C. to allow for prolonged penetration of hydrogel precursors into the sample and then incubated is the gelling solution at 37° C. to allow polymerization. In embodiments, the biological sample is an isolated organ, such as a whole mouse brain, and is incubated in the gelling solution on ice for at least 24 hours to allow extended diffusion of the hydrogel subunits into the sample. Other initiators, such as APS, as well as accelerators, such as TEMED, can be used in the disclosed methods. As is known in the art, optimizing polymerization in the sample can be accomplished by various means, including balancing the amount of an accelerator and inhibitors, as well as using a thermosensitive initiator, such as VA-044.

Homogenization

In embodiments, polymerization (formation of the hydrogel) is followed by homogenization. As used herein, "homogenization" or "homogenizing" means disrupting the physical (mechanical) properties of the sample to facilitate a clean and even expansion, e.g., isotropic expansion, during subsequent swelling of the sample. Homogenization can be achieved by several approaches, including, but not limited to, protease digestion or heat denaturation with surfactants. Homogenization can also include mechanical dissociation, sonication, or other physical, chemical, biochemical, or enzymatic process.

Protease Digestion

In embodiments, the sample is homogenized by digesting with an enzyme, such as a protease. In embodiments, a non-specific protease is used to homogenize the sample-polymer complex. In embodiments, the method can further comprise the step of incubating the sample with a non-specific protease in a buffer comprising a metal ion chelator, a non-ionic surfactant, and a monovalent salt. The general goal of using enzymes such as proteases is to eliminate proteins that are not relevant to later imaging or visualization steps to break them into smaller fragments that be more easily separated during expansion.

In embodiments, protease digestion is employed with samples that have been previously treated with chemical anchoring reagents and labels or tags to link biomolecules to the polymer network, as described for example, in WO/2020/0013883 and ProExM. Digestion removes or reduces the level of endogenous proteins but leaves labels or tags anchored to the hydrogel, thereby preserving the information of the biomolecules.

Denaturation

In embodiments, the sample is homogenized by denaturation. Denaturing a sample refers to denaturing or dissociating biomolecules, including but not limited to, proteins and nucleic acids. Denaturing a biomolecule refers to breaking a bond (covalent or non-covalent) within the biomolecule, thereby degrading, or destroying its conformation, such as a secondary, tertiary, or quaternary conformation, in whole or in part. Denaturation typically does not impact the primary structure of the biomolecule. Thus, for example the peptide backbone of a denatured protein remains intact. Thus, for example, this step of the process can result in two or more biomolecules being physically separated from each other, such as two or more proteins in a protein complex. The general goal of using detergents, typically in combination with heat, is to denature and dissociate biomolecules, such as proteins, so that can be easily separated in the expansion step.

Biomolecules can be denatured in a number of ways, dependent on the nature of the biomolecule. For example, biomolecules that are proteins or nucleic acids can be denatured through contact with a denaturant such a detergent. Non-limiting examples of detergents include lauryl sulfates such as sodium dodecyl sulfate (SDS), ammonium lauryl sulfate, and potassium lauryl sulfate. In some embodiments, the detergent is an anionic detergent, which includes alkylbenzene sulfonates, which consist of a hydrophilic sulfonate head-group and a hydrophobic alkylbenzene tail-group. In some embodiments, the detergent is a cationic detergent such as a quaternary ammonium detergent. In some embodiments, the detergent is a non-ionic detergent, which includes ethoxylates, such as Tween and Triton. In embodiments, the detergent is sodium dodecyl sulfate (SDS). Other detergents or other chemicals are also possible and those skilled in the art would be capable of selecting suitable detergents based upon the teachings of the specification.

In exemplary embodiments, denaturing comprises incubating the sample-hydrogel hybrid at a high temperature. In some embodiments, denaturing at a high temperature comprises a temperature of 60-120° C., including any single temperature within this range, such as 60° C., 61° C. 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., or 90° C., as well as subranges, including 65-120° C., 70-120° C., 75-120° C., 80-120° C., 85-120° C., 90-120° C., 100-120° C. 110-120° C., 60-110° C., 60-100° C., 60-90° C., 60-80° C., 60-70° C., 65-95° C., 70-95° C., 75-95° C., 80-95° C., 85-95° C., or 90-95° C.

In other exemplary embodiments, denaturing comprises incubating the sample-hydrogel hybrid at a lower temperature. In some embodiments, denaturing at a lower temperature comprises a temperature of 30-60° C., or even lower temperatures, including any single temperature within this range, such as 30° C., 31° C., 32° C., 33° C., 34° C., 35° C., 36° C., 37° C., 38° C., 39° C., 40° C., 41° C., 42° C., 43°

C., 44° C., 45° C., 46° C., 47° C., 48° C., 49° C., or 50° C., as well as subranges, including 35-60° C., 40-60° C., 45-60° C., 50-60° C., 55-60° C., 35-55° C., 40-55° C., 45-55° C., 50-55° C., 35-50° C., 40-50° C., 45-50° C., 35-45° C., 40-45° C., or 35-40° C.

In other exemplary embodiments, the sample is incubated a denaturation solution comprises about 200 mM SDS and 50 mM Tris, pH 9.0. In one aspect, the sample is an organ, such as kidney, liver, or heart from an animal. In another aspect, the denaturation solution is heated at 70° C. In another aspect, the denaturation solution is heated at 70° C. for at least 1 day, at least 2 days, or at least 3 days.

In other exemplary embodiments, the sample is incubated in a denaturation solution comprising about 8% SDS. In one aspect, the sample is a whole brain from an animal, including but not limited to a mouse or rat. In embodiments, the denaturation solution comprises 8% SDS and 20 mM Boric Acid and more particularly, has an adjusted pH of about 8.5.

In exemplary embodiments, homogenizing can include passively clearing away lipids from the embedded sample by diffusion (e.g., in SDS buffer at 37° C. for 30 days). In alternative embodiments, homogenizing can include actively clearing lipids away from the embedded sample by electrophoresis (e.g., active clearing with electrophoresis for 3 days). See, e.g., Reveles Jensen and Berg, 2017, *J. Chem. Neuroanatomy* 86, 19-34. Furthermore, homogenizing can include a combination of passively clearing away lipids and actively clearing away lipids (e.g., active clearing with electrophoresis for 12 hours followed by 20 days of passive clearing in SDS buffer at 37° C.).

As will be apparent to those skilled in the art, the choice of homogenization will depend on several considerations, including the size of the sample and the biomolecules to be detected. In the case of larger samples, such as intact organs, for example, incubation in a denaturing solution at a high temperature may be desirable to ensure full penetration of the sample to allow isotropic expansion.

Expansion

In embodiments, the sample is expanded by incubation in a liquid composition (or expansion solution) comprising agarose. In certain embodiments, the agarose is LM agarose. In other embodiments, the expansion solution comprises an aqueous solvent or liquid, such as a low salt solution or water (e.g., agarose water).

In embodiments, expansion is carried out in the expansion solution at a temperature above the gelling point of LM agarose. In embodiments, expansion is carried in the expansion solution at 37° C. In embodiments, expansion is carried out for at least 1 day, at least 2 days, or at least 3 days, and can be at, for example, 37° C.

In embodiments, the concentration of LM agarose in the expansion solution is less than 1%, less than 0.9%, less than 0.8%, less than 0.7%, less than 0.5%, less than 0.4%, less than 0.3%, less than 0.2%, or less than 0.1%. In embodiments, the concentration of LM agarose in the expansion solution is at least 1%, at least 0.9%, at least 0.8%, at least 0.7%, at least 0.5%, at least 0.4%, at least 0.35%, at least 0.3%, at least 0.25%, at least 0.2%, or at least 0.1%. In embodiments, the concentration of LM agarose is about 0.1%, about 0.9%, about 0.8%, about 0.7%, about 0.5%, about 0.4%, about 0.35%, about 0.3%, about 0.25%, about 0.2%, or about 0.1%. In embodiments, the concentration of LM agarose is between 0.1% and 1%, between 0.1% and 0.9%, between 0.1% and 0.8%, between 0.1% and 0.7%, between 0.1% and 0.6%, between 0.2% and 1%, between 0.2% and 0.9%, between 0.2% and 0.8%, between 0.2% and 0.7%, between 0.2% and 0.6%, between 0.3% and 1%, between 0.3% and 0.9%, between 0.3% and 0.8%, between 0.3% and 0.7%, or between 0.3% and 0.6%. In embodiments, the concentration of LM agarose in the expansion solution is about 0.5%. In embodiments, the concentration of LM agarose in the expansion solution is about 0.35%.

In embodiments, the sample is a whole organ. The whole organ can be from an adult animal, such as rodent, and more specifically, a mouse. The whole organ can also be from a developing animal, such as developing rodent, for example a 7-day old mouse brain.

In embodiments, expansion is combined with staining by incubating the sample is an expansion solution that further comprises a dye. In embodiments, the dye can bind to a subcellular component, such as a protein, nucleic acid, steroid, lipid, or carbohydrate. In embodiments, the dye is directed to a subcellular structure or organelle, such as cytoskeletal features, or an organelle, such as the endoplasm reticulum (ER), Golgi apparatus, peroxisome, lysosome, mitochondria, nucleus or nucleolar region, or chloroplasts in plant samples. Exemplary dyes include, without limitation, Lectin-488, Lectin-568, and Lectin 649 (proteins), 4',6-diamidino-2-phenylindole or DAPI (dsDNA); Propidium Iodide (dsDNA), and Acridine Orange (dsDNA, ssDNA, and RNA).

Preparation of Large Specimens

In certain exemplary embodiments, the methods are useful in preparation of larger biological samples, including large solid tissues and intact whole organs, for super resolution imaging. In embodiments, the organ is an organ from a rodent, such a mouse or rat. In embodiments, the organ is brain, kidney, kidney, liver, heart, lungs, spleen, heart, small or large intestines, stomach, or bladder. In embodiments, the sample is a structure of an organ, for example, a brain structure, such as hippocampus, hypothalamus, or amygdala. In embodiments, the sample is dissected from an animal following perfusion with a fixative solution and subsequent incubation in a fixation (or fixative) solution, wherein the fixative comprises paraformaldehyde, and more particularly, 4% paraformaldehyde. In other embodiments, the fixative comprises paraformaldehyde or glutaraldehyde. In embodiments, the fixative solution does not include a hydrogel monomer or other hydrogel precursor.

In other exemplary embodiments, the methods include permeabilizing the sample with a gelling solution comprising a high concentration of a stable monomer, such as acrylamide, to confer increased hardness and stability to the large sample. The gelling solution can also include a temperature dependent polymerization initiator that is not active at lower temperatures, such as VA-044, allowing for extended incubation of the sample in the gelling solution on ice (or at a non-active temperature) to help ensure full penetration of the sample. Accordingly, in some embodiments, the disclosure provides a method of generating an expanded biological sample, comprising permeating the biological sample with a gelling solution with a high concentration of a stable monomer. In embodiments, the stable monomer is acrylamide. In embodiments, the gelling solution comprises a temperature dependent polymerization inhibitor, which can be VA-044. In embodiments, the sample is first incubated on ice and then transferred to a permissive temperature, e.g., 37° C., to allow polymerization of the polymer to occur.

In embodiments, the methods can include homogenizing the sample in a modified denaturation solution that efficiently penetrates and disrupts the sample-hydrogel hybrid to ensure that subsequent expansion is uniform (isotropic) in three dimensions. In embodiments, denaturation can be carried out under conditions that preserve adequate tissue structure that will favor successful antibody labeling, as desired. Accordingly, in some embodiments, the disclosure provides a method of generating an expanded biological sample, comprising permeating a sample-hydrogel hybrid with a denaturing solution that will facilitate uniform expansion. In embodiments, the denaturing solution comprises an ionic detergent, which can be SDS. More particularly, the denaturation solution comprises 200 mM SDS. In embodiments, the sample is incubated in the denaturation solution at 70° C. The incubation time can be at least 1 day, at least 2 days, or at least 3 days.

In embodiments, the methods include incubating the sample in an expansion solution comprising LM agarose, as described herein, to confer rigidity to the expanded sample. Advantageously, the expanded solution can also include a dye to allow for concurrent and efficient staining of the sample during expansion. In addition, the added stability conferred by agarose allows a large sample that is subsequently embedded in agarose to be sliced or cut without compromising the integrity of the sample. Accordingly, in some embodiments, the disclosure provides a method of generating an expanded biological sample, comprising incubating a sample-hydrogel hybrid with an expansion solution comprising LM agarose to generate the expanded biological sample. In embodiments, the sample is incubated in the expansion solution at 37° C. In embodiments, the expansion time can be at least 1 day, at least 2 days, at least 3 days, or at least 4 days. In embodiments, the expansion solution can additionally include a dye or stain, such as Lectin 488, Lectin 594, Lectin 649, DAPI, Propidium Iodide, Acridine Orange, or a combination of one or more thereof.

Accordingly, the method can comprise one or more of the preceding steps, including permeabilizing the sample, homogenizing the sample, and expanding the sample, as disclosed herein. In embodiments, the method comprises permeabilizing the sample, homogenizing the sample, and expanding the sample. In embodiments, the sample is permeabilized in a solution comprising a high concentration of a stable monomer, and more particularly, acrylamide, as described herein; homogenized in a denaturing solution comprising SDS, as described herein; and incubated in an expansion solution comprising LM agarose, and optionally a dye, as described herein.

In embodiments, the methods can be used in conjunction with tissue clearing methods, including those used for delipidation of intact brain specimens, to enhance the stability of the processed sample. See, e.g., Murakami et al. 2018, *Nature Neurosci.* 21, 625-637 (CUBIC-X); Ertüirk et al. 2012, *Nature Protoc.* 7, 1983-1995 (3DISCO); Chung et al. 2012, *Nature* 497, 332-337 (CLARITY); Susaki et al. 2014, *Cell* 157, 726-739 (CUBIC).

In embodiments, a large sample, such as an intact rodent organ, can be prepared for super resolution imaging by expansion and microscopy, in particular lightsheet expansion microscopy, in accordance with the protocol and steps depicted in FIG. 1.

In step 1, a large sample—in this case an intact mouse brain, is dissected from the animal following perfusion with a fixative solution and subsequent incubation in a fixation solution. In embodiments, the fixative comprises paraformaldehyde, and more particularly, 4% paraformaldehyde. In other embodiments, the fixative comprises paraformaldehyde or glutaraldehyde. In embodiments, the fixative solution does not include a hydrogel monomer or other hydrogel precursor.

In step 2, the fixed organ is incubated in a gelation solution. In embodiments, the gelation solution includes a high hydrogel monomer concentration, a crosslinker, and a temperature dependent initiator. In embodiments, the sample is initially preincubated in the gelling solution at a low temperature, e.g., 4° C., to enhance penetration of the hydrogel components.

As shown in step 3, following incubation in the gelling solution at a permissive initiator temperature, e.g., 37° C. for VA-044, the sample becomes embedded in a densely crosslinked hydrogel.

In step 4, the hydrogel embedded sample is homogenized by denaturation in an SDS solution at a higher temperature. This step helps to ensure that the large sample will be uniformly expandable in step 5.

In step 5, the embedded and homogenized sample is incubated in an expansion solution that swells the hydrogel, allowing for uniform sample expansion (as indicated by the arrows). The expansion solution contains LM agarose as a matrix-supporting component, which will facilitate subsequently processing and imaging of the large expanded sample. In embodiments, the expansion solution comprises LM agarose at a concentration of about 0.35%, about 0.5%, at least 0.35%, at least 0.5%, less than 1%, or less than 0.5%. In embodiments, the expansion solution also includes one or more dyes or stain, such as a dyes or stains directed to cell-selective markers, subcellular structures, cytoskeletal elements, or organelles.

As depicted in step 6, the matrix-supported expanded sample can be embedded in an LM agarose block, such as 4% LM agarose, for subsequent slicing during imaging or for long term storage. The presence of LM agarose in the sample matrix confers compatibility with the LM agarose block, thereby ensuring that the sample will maintain its integrity and uniformity. Advantageously, this can also allow subsequent imaging by scanning and slicing, as described herein. Alternatively, the expanded sample can be imaged (without subsequent block embedding) in a microscope chamber, such as a water chamber with a water immersion objective, following attachment to a sample holder. In embodiments, the sample is imaged by lightsheet microscopy, which allows for fast imaging of a large field of view, with very deep optical penetration and limited photobleaching. In embodiments, the expanded sample can be imaged by a confocal or 2-photon microscopes. In embodiments, the protocol includes other steps such as staining the sample with a labeled antibody at various steps, such as after fixation, after gelation, after homogenization, or after expansion.

Antibody Staining

In embodiments, samples can be labeled with antibodies, as described herein. For example, fluorescently tagged antibodies can be applied before or after expansion. Although the fidelity of individual antibodies must be confirmed, the existence of large commercial antibody libraries provides many candidates to test for binding to desired biomolecules. In embodiments, labeling can be direct, e.g., by a directly labeled primary antibody. In embodiments, labeling can be indirect, e.g., by subsequent incubation with a secondary antibody. In embodiments, the secondary antibody is polyclonal and generated against the primary antibody such that the secondary antibody solution recognizes multiple epitopes associated with the primary antibody. In embodiments, the primary antibody (direct staining) or secondary antibody (indirect staining) comprises a label that directly or indirectly produces a signal. For example, a biotin label, a fluorescent label, an enzyme label (e.g., HRP), a coenzyme label, a chemiluminescent label, or a radioactive isotope label. In other embodiments, the secondary antibody comprises a fluorescent label detectable by a conventional confocal microscope or any other type of imaging system.

Post-Expansion Processing and Imaging

In embodiments, an expanded sample formed by any of the preceding methods can be stored in the agarose water (expansion solution) at 37° C. Prior to imaging on an optical microscope, the sample can be rinsed in distilled water to remove excess LM agarose.

An expanded sample can also be stored in a low salt solution, such as 1×PBS, to reduce its size. Indeed, by incubation in solutions of different ionic strength, the physical size of the sample can be modulated. In the case of a brain sample, for example, global projection patterns of labeled neurons can be imaged after sample shrinkage using high-speed microscopy techniques, followed by super-resolution imaging of regions of interest after maximum sample expansion.

In the case of exceptionally large samples, the sample can be sliced prior to imaging to meet the objective's WD limit. Alternatively, a microscope with a built-in vibrating-blade microtome could also be used for wholemount imaging to avoid loss of connectivity information. This approach can allow the user to reduce the imaging time and costs associated with data storage and handling of expanded samples. Alternatively, the presence of LM agarose in an expanded sample is compatible with embedding in a mounting block, such as one composed of 4% LM agarose.

In embodiments, the biological sample is a brain sample, and the methods can be used to prepare specimens for the study of connections and networks in the central nervous system, such as the connections at the single cell level, e.g., synapses, axonal termini, dendritic spines, etc., as well as connection between groups of neurons and regions of the CNS. See, e.g., WO20020013833. In this, regarding, the matrix-assisted methods are particularly adaptable for large scale and intact organ samples, such as brain samples. By preserving proteome content, the methods can allow detailed assessment of fine subcellular details and intercellular connectivity in large brain samples, such as intact whole brains from animal models.

The methods can also be used to evaluate, diagnose, or monitor a disease. For example, a biopsy can be prepared from a cancerous tissue and microscopically analyzed to determine the type of cancer, the extent to which cancer has developed, whether the cancer will be responsive to therapeutic intervention, etc. As another example, a biopsy can be prepared from a diseased tissue, such from kidney, heart, stomach, liver, pancreas, intestines, brain, etc., to determine the condition of the tissue, the extent to which the disease has developed, the likelihood that tissue will be successful, etc.

The methods can also be used to evaluate normal issues, organs, and cells, for example to evaluate the development, maturation, and differentiation of the nervous system, as well subsequent plasticity and activity after development has been completed.

The methods can also be used to screen candidate therapeutic agents for their effect on a tissue or disease. For example, a sample obtained from subject, such a mouse, rat, dog, primate, human, etc., that has been contacted with a candidate agent can be prepared by matrix-assisted expansion and microscopically analyzed for one or more cellular or tissue parameters, i.e., attributes or characteristics of subcellular components that can be measured.

The methods can also be used to visualize the distribution of genetically encoded markers in a whole tissue or intact whole organ, such as a mouse brain at subcellular resolution. Such markers can include, for example, chromosomal abnormalities (inversions, duplications, translocations), loss of genetic heterozygosity, the presence of genetic markers indicating a predisposition towards a disease state or healthy state. Such detection can be useful, for example, in diagnosing and monitoring disease, such as in personalized medicine, studying paternity, or other applications.

In embodiments, the expansion solution is compatible with, and can be used in, emerging clearing methods, such as the CUBIC series, including those using ScaleCUBIC-1 as a delipidation reagent. It also can be use in clearing methods that use other reagents, such as those for depigmentation, decolorization, decalcification, or refractive index matching. Such processing steps can be particularly useful in the case of highly pigmented tissues, such as kidney or liver, or calcified tissues, such as bone. See, e.g., Murakami et al. 2018, *Nature Neurosci.* 21, 625-637 (CUBIC-X); Ertürk et al. 2012, *Nature Protoc.* 7, 1983-1995 (3DISCO); Chung et al. 2012, *Nature* 497, 332-337 (CLARITY); Susaki et al. 2014, *Cell* 157, 726-739 and Tainaka et al. 2018, *Cell Reports* 24, 2196-2210 (CUBIC).

The specification is further directed to the following numbered embodiments.

Embodiment 1. A method of preparing an expanded biological sample, comprising incubating an embedded biological sample in an expansion solution comprising LM agarose.

Embodiment 2. The method of embodiment 1, wherein the embedded biological sample is embedded in a swellable material.

Embodiment 3. The method of embodiment 2, wherein the swellable material is a hydrogel.

Embodiment 4. The method of any one of embodiments 1 to 3, wherein the embedded biological sample has been homogenized.

Embodiment 5. The method of embodiment 4, wherein the embedded biological sample has been homogenized by digestion in a solution comprising an enzyme.

Embodiment 6. The method of embodiment 5, wherein the enzyme is a protease, and more particularly, is proteinase K.

Embodiment 7. The method of embodiment 4, wherein the embedded biological sample has been homogenized by denaturation in a solution comprising a detergent.

Embodiment 8. The method of embodiment 7, wherein the detergent is an ionic detergent.

Embodiment 9. The method of embodiment 8, wherein the ionic detergent is SDS.

Embodiment 10. The method of embodiment 7, wherein the solution comprises 8% SDS and 200 nM Boric Acid, pH 9.0

Embodiment 11. The method of any one of embodiments 1 to 10, wherein the expansion solution comprises at least 0.35% LM agarose.

Embodiment 12. The method of any of embodiments 1 to 10, wherein the expansion solution comprises at least 0.5% LM agarose.

Embodiment 13. The method of any of embodiment 1 to 10, wherein the expansion solution comprises less than 1% LM agarose.

Embodiment 14. The method of any one of embodiments 1 to 10, wherein the expansion solution comprises less than 0.5% LM agarose.

Embodiment 15. The method of any one of embodiments 1 to 14, wherein the embedded biological sample is incubated in the expansion solution at a temperature of at least 37° C., and more particularly, is incubated in the expansion solution for at least 2 days.

Embodiment 16. The method of any one of embodiments 1 to 15 wherein the expansion solution further comprises a dye, label, stain, or combination thereof.

Embodiment 17. The method of embodiment 16, wherein the dye is Lectin 488, Lectin 594, Lectin 649, DAPI, Propidium Iodide, Acridine Orange, or a combination of one or more thereof.

Embodiment 18. The method of any one of embodiments 1 to 17, further comprising storing the expanded sample in the expansion solution at a temperature of at least 37° C., and more particularly, 37° C.

Embodiment 19. The method of any one of the preceding embodiments, further comprising the step of high resolution imaging of the expanded sample by microscopy, and more particularly, by light-sheet microscopy.

Embodiment 20. The method of any one of embodiments 19, wherein prior to imaging, the expanded sample is transferred to water, and more particularly, is transferred to water for at least 2 hours at room temperature.

Embodiment 21. The method of embodiment 20, further comprising mounting the sample on an image holder and imaging the sample in a water chamber.

Embodiment 22. The method of embodiment 20, further comprising, prior to imaging, mounting the expanded biological sample in an agarose block, and more particularly, a LM agarose block.

Embodiment 23. The method of embodiment 22, further comprising, prior to imaging, cutting the block containing the expanded biological sample into one or more portions, and imaging the one or more portions comprising the expanded sample.

Embodiment 24. The method of embodiment 22, further comprising imaging a layer of the block containing the embedded sample, removing the imaged layer from the block, and imaging an adjacent layer of the agarose block.

Embodiment 25 The method of embodiment 24, wherein imaging is carried out by a scan and slice approach using a microscope with a built-in vibrating-blade microtome Embodiment 26. The method of any one of embodiments 20 to 25, wherein a high resolution image of the biological sample expanded with LM agarose is obtained in a shorter time compared to that of a biological sample expanded without LM agarose.

Embodiment 27. The method of any one of the preceding embodiments, wherein the biological sample is a cell, tissue, organism, organ structure, or intact organ, and more particularly, is an intact organ from a rodent, such as a mouse.

Embodiment 28. The method of embodiment 27, wherein the intact organ is a brain, particularly a rodent brain, and more particularly, a mouse brain.

Embodiment 29. The method of any one of embodiments 2 to 28, wherein the biological sample is embedded in a swellable material by incubating the biological sample in a gelling solution comprising hydrogel monomers and polymerizing the monomers to form a hydrogel-embedded sample.

Embodiment 30. The method of embodiment 29, wherein the monomers comprise acrylamide.

Embodiment 31. The method of embodiment 29, wherein the monomers comprise sodium acrylate.

Embodiment 32. The method of embodiment 29, wherein the monomers comprise acrylamide and sodium acrylate.

Embodiment 33. The method of embodiment 29, wherein the gelling solution comprises about 1 wt % to about 5 wt % acrylamide and about 10 wt % to about 20 wt % sodium acrylate, and more particularly comprises at least 4 wt % acrylamide and at least 15 wt % sodium acrylate.

Embodiment 34. A method of preparing an expanded biological sample, comprising: (a) embedding a biological sample in a swellable material; (b) homogenizing the embedded biological sample; and (c) incubating the embedded and homogenized biological sample in an expansion solution comprising LM agarose to swell the swellable material and generate the expanded biological sample.

Embodiment 35. The method of embodiment 34, wherein the swellable material is a hydrogel.

Embodiment 36. The method of embodiment 35, wherein step (a) further comprises incubating the biological sample in a gelling solution comprising hydrogel monomers and polymerizing the monomers to form a hydrogel-embedded sample.

Embodiment 37. The method of embodiment 36, wherein the monomers comprise acrylamide.

Embodiment 38. The method of embodiment 36, wherein the monomers comprise sodium acrylate.

Embodiment 39. The method of embodiment 36, wherein the monomers comprise acrylamide and sodium acrylate.

Embodiment 40. The method of embodiment 36, wherein the gelling solution comprises about 1 wt % to about 5 wt % acrylamide and about 10 wt % to about 20 wt % sodium acrylate, and more particularly comprises at least 4 wt % acrylamide and at least 15 wt % sodium acrylate.

Embodiment 41. The method of any one of embodiments 29 to 33, wherein the gelling solution further comprises a cross linker.

Embodiment 42. The method of any one of embodiments 36 to 41, wherein the gelling solution comprises a polymerization initiator.

Embodiment 43. The method of embodiment 42, wherein the polymerization initiator is temperature-dependent.

Embodiment 44. The method of embodiment 43, wherein the temperature-dependent polymerization initiator is VA-044.

Embodiment 45. The method of any one of embodiments 36 to 44, wherein in step (a), the biological sample is incubated in the gelling solution at 4° C. for at least 24 hours.

Embodiment 46. The method of embodiment 45, wherein in step (a), the biological sample is subsequently incubated in the gelling solution at a temperature of at least 37° C. in the presence of about 0.5 wt VA-044.

Embodiment 47. The method of embodiment 46, wherein in step (a), the biological sample is incubated in the gelling solution on ice prior to being incubated at about 37° C.

Embodiment 48. The method of any one of embodiments 34 to 47, wherein homogenizing step (b) comprises digesting the embedded biological sample in a solution comprising an enzyme.

Embodiment 49. The method of embodiment 48, wherein the enzyme is a protease.

Embodiment 50. The method of embodiment 49, wherein the protease is proteinase K.

Embodiment 51. The method of any one of embodiments 34 to 47, wherein homogenizing step (b) comprises denaturing the embedded biological sample in a solution comprising a detergent.

Embodiment 52. The method of embodiment 51, wherein the detergent is an ionic detergent.

Embodiment 53. The method of embodiment 52, wherein the ionic detergent is SDS.

Embodiment 54. The method of embodiment 51, wherein the solution in step (b) comprises 8% SDS and 200 nM Boric Acid, pH 9.0.

Embodiment 55. The method of embodiment 51, wherein the solution in step (b) comprises 200 mM SDS, 50 mM Tris, pH 9.0.

Embodiment 56. The method of any one of embodiments 51 to 55, wherein in step (b), the embedded biological sample is incubated in the denaturation solution at a temperature of at least 37° C. for at least 5 days, at least 10 days, at least 20 days, or at least 30 days.

Embodiment 57. The method of any one of embodiments 51 to 55, wherein in step (b), the embedded biological sample is incubated in the denaturation solution at a temperature of at least 70° C. for at least 1 day, at least 2 days, at least 3 days, or at least 4 days.

Embodiment 58. The method of any one of embodiments 34 to 47, wherein homogenizing step (b) comprises passively clearing lipids from the embedded sample by diffusion.

Embodiment 59. The method of any of embodiments 34 to 47, wherein homogenizing step (b) comprises actively clearing lipids from the embedded sample by electrophoresis.

Embodiment 60. The method of embodiment 58 or 59, wherein homogenizing step (b) comprises incubating the embedded sample with SDS prior to clearing lipids from the embedded sample.

Embodiment 61. The method of any one of embodiments 34 to 60, wherein the expansion solution comprises at least 0.35% LM agarose.

Embodiment 62. The method of any one of embodiments 34 to 60, wherein the expansion solution comprises at least 0.5% LM agarose.

Embodiment 63. The method of any of embodiments 34 to 60, wherein the expansion solution comprises less than 1% LM agarose.

Embodiment 64. The method of any one of embodiments 34 to 60, wherein the expansion solution comprises less than 0.5% LM agarose.

Embodiment 65. The method of any one of embodiments 34 to 64, wherein the embedded and homogenized biological sample is incubated in the expansion solution at a temperature of at least 37° C.

Embodiment 66. The method of any one of the preceding embodiments, wherein prior to step (a) the biological sample is incubated with a chemical linker capable of binding a target and the swellable material.

Embodiment 67. The method of embodiment 66 wherein the target comprises a nucleic acid.

Embodiment 68. The method of embodiment 66, wherein the target comprises a protein.

Embodiment 69. The method of any one of embodiments 66 to 68, wherein the chemical linker is labeled.

Embodiment 70. The method of any one of embodiments 34 to 69, wherein the embedded and homogenized biological sample is incubated in the expansion solution at a temperature of at least 37° C. for at least two days.

Embodiment 71. The method of embodiment 70, wherein the embedded and homogenized biological sample is incubated in the expansion solution for an additional period of at least two days, more particularly, at 37° C.

Embodiment 72. The method of any one of embodiments 61 to 71, wherein the expansion solution further comprises a dye, label, stain, or combination thereof.

Embodiment 73. The method of embodiment 72, wherein the dye is Lectin 488, Lectin 594, Lectin 649, DAPI, Propidium Iodide, Acridine Orange, or a combination of one or more thereof.

Embodiment 74. The method of any one of embodiments 34 to 73, further comprising storing the expanded sample in the expansion solution at a temperature of at least 37° C., and more particularly, 37° C.

Embodiment 75. The method of embodiment 74, further comprising the step of high resolution imaging of the expanded sample by microscopy, and more particularly, by light-sheet microscopy.

Embodiment 76. The method of embodiment 75, wherein prior to imaging, the expanded sample is transferred to water, and more particularly, is transferred to water for at least 2 hours at room temperature.

Embodiment 77. The method of embodiment 76, further comprising mounting the sample on an image holder and imaging the sample in a water chamber.

Embodiment 78. The method of embodiment 75, further comprising, prior to imaging, mounting the expanded biological sample in an agarose block, and more particularly, a LM agarose block.

Embodiment 79. The method of embodiment 78, further comprising, prior to imaging, cutting the block containing the expanded biological sample into one or more portions, and imaging the one or more portions comprising the expanded sample.

Embodiment 80. The method of embodiment 78, further comprising imaging a layer of the block containing the embedded sample, removing the imaged layer from the block, and imaging an adjacent layer of the agarose block.

Embodiment 81. The method of embodiment 80, wherein imaging is carried out by a scan and slice approach using a microscope with a built-in vibrating-blade microtome.

Embodiment 82. The method of any one of embodiments 1 to 81, wherein a high resolution image of the biological sample expanded with LM agarose is obtained in a shorter time than that of a biological sample expanded without LM agarose.

Embodiment 83. The method of any one of the preceding embodiments, wherein the biological sample is a cell, tissue, organism, organ structure, or intact organ, and more particularly, is an intact organ.

Embodiment 84. The method of embodiment 83, wherein the intact organ is a brain, particularly a rodent brain, and even more particularly, a mouse brain.

Embodiment 85. The method of any one of the preceding embodiments, wherein the biological sample is obtained from an animal that has been perfused with a solution comprising a fixative and subsequently incubated in a solution comprising a fixative.

Embodiment 86. The method of embodiment 85, wherein the fixative is formaldehyde, paraformaldehyde, or glutaraldehyde.

Embodiment 87. The method of embodiment 86, whether the solution comprises about 4% paraformaldehyde.

Embodiment 88. The method any one of embodiments 85 to 87, wherein the solution does not include a monomer or other hydrogel precursor.

Embodiment 89. The method of any one of embodiments 1 to 88, further comprising labeling a biomolecule of the biological sample by immunofluorescence or immunohistochemistry.

Embodiment 90. The method of any one of embodiments 1 to 88, further comprising labeling a biomolecule of the biological sample with a detectable ligand.

Embodiment 91. The method of embodiment 90, wherein the detectable ligand is a dye, label, or combination thereof.

Embodiment 92. The method of embodiment 91, wherein the dye is Lectin 488, Lectin 594, Lectin 649, DAPI, Propidium Iodide, Acridine Orange, or a combination of one or more thereof.

Embodiment 93. The method of embodiment 90, wherein the detectable ligand is an antibody, an antibody fragment, an antibody mimetic, a nucleic acid, or a nucleic acid analog.

Embodiment 94. The method of embodiment 90 or 93, wherein the detectable ligand is conjugated to an enzyme or a fluorophore.

Embodiment 95. A composition for use in expanding a biological sample, wherein the composition is a liquid solution comprising LM agarose, and wherein the biological sample is embedded in a swellable material.

Embodiment 96. The composition according to embodiment 83, wherein the swellable material is a hydrogel.

Embodiment 97. The composition according to embodiment 83 or 84, wherein the embedded biological sample has been homogenized.

Embodiment 98. The composition according to any one of embodiments 85 to 87, wherein the solution comprises at least 0.35% LM agarose.

Embodiment 99. The composition according to any one of embodiments 85 to 87, wherein the solution comprises at least 0.5% LM agarose.

Embodiment 100. The composition according to any one of embodiments 85 to 87, wherein the solution comprises less than 1% LM agarose.

Embodiment 101. The composition according to any one of embodiments 85 to 87, wherein the solution comprises less than 0.5% LM agarose.

Embodiment 102. The composition according to any one of embodiments 85 to 91, wherein the solution further comprises a dye, label, stain, or combination thereof.

Embodiment 103. The composition according to embodiment 92, wherein the dye is Lectin 488, Lectin 594, Lectin 649, DAPI, Propidium Iodide, Acridine Orange, or a combination of one or more thereof.

Embodiment 104. The composition according to any one of embodiments 83-92, wherein the solution is stored at a temperature of at least 37° C.

Embodiment 105. The composition according to of any one of embodiments 83 to 93, wherein the solution is an aqueous or a low salt solution.

Embodiment 106. A composite comprising a biological sample embedded in a hydrogel and LM agarose.

Embodiment 107. The composite of embodiment 106, wherein the hydrogel is formed by incubating the biological sample in a gelling solution comprising monomers and polymerizing the monomers.

Embodiment 108. The composite of embodiment 107, wherein the monomers comprise acrylamide.

Embodiment 109. The composite of embodiment 107, wherein the monomers comprise sodium acrylate.

Embodiment 110. The composite of embodiment 107, wherein the monomers comprise acrylamide and sodium acrylate.

Embodiment 111. The composite of embodiment 106, wherein the hydrogel is formed by incubating the biological sample in a gelling solution comprising about 1 wt % to about 5 wt % acrylamide and about 10 wt % to about 20 wt % sodium acrylate.

Embodiment 112. The composite of any one embodiments 106 to 111, wherein the biological sample is embedded in less than 1% LM agarose.

Embodiment 113. The composite of any one of embodiments 106 to 111, wherein the biological sample is embedded in less than 0.5% LM agarose.

Embodiment 114. The composite of any one of embodiments 106 to 111 wherein the biological sample is embedded in about 0.35% LM agarose.

Embodiment 115. The composite of any one of embodiments 106 to 111, wherein the biological sample is embedded in less than 0.35% LM agarose.

Embodiment 116. The composite of any one of embodiments 106 to 111, wherein the biological sample is embedded in at least 0.35% LM agarose.

Embodiment 117. The composite of any one of embodiments 106 to 111, further comprising a dye, label, stain, or combination thereof.

Embodiment 118. The composition of embodiment 117, wherein the dye is Lectin 488, Lectin 594, Lectin 649, DAPI, Propidium Iodide, Acridine Orange, or a combination of one or more thereof.

Embodiment 119. A method of preparing a biological sample for expansion microscopy, wherein the biological sample is an intact animal organ, comprising: (a) incubating the biological sample in a gelling solution comprising hydrogel monomers and polymerizing the monomers to form a hydrogel-embedded sample; (b) homogenizing the hydrogel-embedded biological sample by denaturation; and (c) incubating the embedded and homogenized biological sample in an expansion solution comprising LM agarose to swell the hydrogel and generate an expanded biological sample.

Embodiment 120. The method of embodiment 119, wherein the hydrogel monomers comprise acrylamide and sodium acrylate.

Embodiment 121. The method of embodiment 119 or 120, wherein the gelling solution comprises a cross linker.

Embodiment 122. The method of embodiment 119, wherein the gelling solution comprises about 1 wt % to about 5 wt % acrylamide and about 10 wt % to about 20 wt % sodium acrylate, and more particularly comprises at least 4 wt % acrylamide and at least 15 wt % sodium acrylate.

Embodiment 123. The method of any one of embodiments 119 to 122, wherein the gelling solution comprises a polymerization initiator.

Embodiment 124. The method of embodiment 123, wherein the polymerization initiator is temperature-dependent.

Embodiment 125. The method of embodiment 124, wherein the temperature-dependent polymerization initiator is VA-044.

Embodiment 126. The method of any one of embodiments 119 to 125, wherein the biological sample is incubated in the gelling solution at 4° C. for at least 24 hours.

Embodiment 127. The method of embodiment 126, wherein the biological sample is subsequently incubated in the gelling solution at a temperature of at least 37° C. in the presence of about 0.5 wt VA-044.

Embodiment 128. The method of embodiment 127, wherein the biological sample is incubated in the gelling solution on ice prior to being incubated at about 37° C.

Embodiment 129. The method of any one of embodiments 119 to 128, wherein homogenizing step (b) comprises denaturing the embedded biological sample in a solution comprising a detergent, particularly an ionic detergent, and more particularly SDS.

Embodiment 130. The method of embodiment 129, wherein the solution in step (b) comprises 8% SDS and 200 nM Boric Acid, pH 9.0.

Embodiment 131. The method of embodiment 129, wherein the solution in step (b) comprises 200 mM SDS, 50 mM Tris, pH 9.0.

Embodiment 132. The method of embodiment 130 or 131, wherein in step (b), the embedded biological sample is incubated in the denaturation solution at a temperature of at least 37° C. for at least 5 days, at least 10 days, at least 20 days, or at least 30 days.

Embodiment 133. The method of embodiment 130 or 131, wherein in step (b), the embedded biological sample is incubated in the denaturation solution at a temperature of at least 70° C. for at least 1 day, at least 2 days, at least 3 days, or at least 4 days.

Embodiment 134. The method of any one of embodiments 119 to 128, wherein homogenizing step (b) comprises passively clearing lipids from the embedded sample by diffusion.

Embodiment 135. The method of any of embodiments 119 to 128, wherein homogenizing step (b) comprises actively clearing lipids from the embedded biological sample by electrophoresis.

Embodiment 136. The method of embodiment 134 or 135, wherein homogenizing step (b) comprises incubating the embedded sample with SDS prior to clearing lipids from the embedded biological sample.

Embodiment 137. The method of any one of embodiments 119 to 136, wherein the expansion solution comprises at least 0.35% LM agarose.

Embodiment 138. The method of any one of embodiments 119 to 136, wherein the expansion solution comprises at least 0.5% LM agarose.

Embodiment 139. The method of any of embodiments 119 to 136, wherein the expansion solution comprises less than 1% LM agarose.

Embodiment 140. The method of any one of embodiments 119 to 136, wherein the expansion solution comprises less than 0.5% LM agarose.

Embodiment 141. The method of any one of embodiments 137 to 140, wherein the embedded and homogenized biological sample is incubated in the expansion solution at a temperature of at least 37° C. for at least two days.

Embodiment 142. The method of embodiment 141, wherein the embedded and homogenized biological sample is incubated in the expansion solution for an additional period of at least two days, more particularly, at 37° C.

Embodiment 143. The method of any one of embodiments 137 to 142, wherein the expansion solution further comprises a dye, label, stain, or combination thereof.

Embodiment 144. The method of embodiment 143, wherein the dye is Lectin 488, Lectin 594, Lectin 649, DAPI, Propidium Iodide, Acridine Orange, or a combination of one or more thereof.

Embodiment 145. The method of any one of embodiments 119 to 144, further comprising storing the expanded sample in the expansion solution at a temperature of at least 37° C., and more particularly, 37° C.

Embodiment 146. The method of embodiment 145, further comprising the step of high resolution imaging of the expanded sample by microscopy, and more particularly, by lightsheet microscopy.

Embodiment 147. The method of embodiment 146, wherein prior to imaging, the expanded sample is transferred to water, and more particularly, is transferred to water for at least 2 hours at room temperature.

Embodiment 148. The method of embodiment 147, further comprising mounting the sample on an image holder and imaging the sample in a water chamber.

Embodiment 149. The method of embodiment 147, further comprising, prior to imaging, mounting the expanded biological sample in an agarose block, and more particularly, a LM agarose block.

Embodiment 150. The method of embodiment 149, further comprising, prior to imaging, cutting the block containing the expanded biological sample into one or more portions, and imaging the one or more portions comprising the expanded sample.

Embodiment 151. The method of embodiment 149, further comprising imaging a layer of the block containing the embedded sample, removing the imaged layer from the block, and imaging an adjacent layer of the agarose block.

Embodiment 152. The method of embodiment 151, wherein imaging is carried out by a scan and slice approach using a microscope with a built-in vibrating-blade microtome.

Embodiment 153. The method of any one of embodiments 119 to 152, wherein a high resolution image of the biological sample expanded with LM agarose is obtained in a shorter time than that of a biological sample expanded without LM agarose.

Embodiment 154. The method of embodiment any one of embodiments 119 to 153, wherein the intact organ is a brain, particularly a rodent brain, and even more particularly, a mouse brain.

Embodiment 155. The method of any one of the preceding embodiments, wherein the biological sample is obtained from an animal that has been perfused with a solution comprising a fixative and subsequently incubated in a solution comprising a fixative.

Embodiment 156. The method of embodiment 155, wherein the fixative is formaldehyde, paraformaldehyde, or glutaraldehyde.

Embodiment 157. The method of embodiment 156, whether the solution comprises about 4% paraformaldehyde.

Embodiment 158. The method any one of embodiments 155 to 157, wherein the solution does not include a monomer or other hydrogel precursor.

Embodiment 159. The method of any of embodiments 119 to 158, wherein the intact animal organ is derived from a rodent.

Embodiment 160. The method of embodiment 159, wherein the intact animal organ is derived from a mouse.

Embodiment 161. The method of embodiment 160, wherein the intact animal organ is a brain.

Examples

The present disclosure will be further illustrated by the following non-limiting Examples. These Examples are understood to be exemplary only, and they are not to be construed as limiting the scope of the one or more embodiments, and as defined by the appended claims.

Matrix-Assisted Processing of Large Intact Mouse Organs for Super Resolution Imaging Background ExM is an emerging technology that enables biological samples to be imaged with nanoscale precision and resolution on ordinary, diffraction-limited microscopes. ExM generally works by physically magnifying a specimen in a uniform (isotropic) manner in three dimensions. The processing steps typically involve sample embedding, which involves perfusing and cross-linking a specific type of polymer (such as acrylamide or sodium acrylate) throughout a fixed tissue, homogenizing the sample by protease digestion, adding water to expand the tissue and achieve tissue transparency, and carrying out effective super-resolution imaging with a conventional diffraction-limited microscope.

A related expansion approach is Magnified Analysis of the Proteome (MAP), which relies on a different hydrogel formulation to minimize protein cross-linking in hydrogels and employs denaturation rather than protease digestion to homogenize the sample (thereby preserving endogenous protein information) but has the same objective as ExM: expanding a tissue sample to achieve transparency and better image resolution. See, e.g., International Patent Application Publication Nos. WO 2015/127183, WO 2017/027368, WO 2017/027367, WO 2017/147435, WO 2017/190101, WO 2019/156957, WO/2019/241662, and WO 2020/013833.

In all methods, expansion increases the distance between biomolecules (or labels) of interest while preserving their spatial relationship, thereby bringing sub-diffraction limited structures into a range viewable with a conventional, diffraction-limited microscope. For example, after a typical ~4.5-fold linear expansion (~100-fold volumetric expansion) of a specimen, the effective resolution of a microscope objective lens with ~300-nm diffraction-limited resolution becomes ~70 nm (300 nm divided by ~4.5).

In expansion protocols, the processed samples are delicate hydrogels (in association with biomolecules) that become increasingly soft and fragile as they enlarge. Indeed, fully expanded samples can comprise as much as 99% water. These limitations can impede or preclude subsequent manipulations and processing, especially for larger specimens, such as intact tissues, organs, or organ structures. Imaging large specimens, for example, can be problematic, as the focus of the unstable gel surface can shift if the sample is moved abruptly or too quickly. One approach to deal with this issue is moving the sample stage at an extremely slow rate between different field of views. But this approach is very time-consuming and is therefore particularly problematic where image capture requires extensive scanning—as is the case with a large tissue or intact organ sample.

These sample attributes can also preclude the ability to completely scan large samples and capture critical details, such as neuronal connections in the case of a brain preparation. For example, when a whole adult mouse brain ($1 \times 1.5 \times 0.8$ cm$^3$), gets expanded 4 times ($4 \times 4 \times 3.2$ cm$^3$), it is difficult for any current microscope system to completely scan the sample, due to the objective working distance, normally ranging from couple microns to 2 centimeters. One way to potentially address this issue is to cut the sample after imaging a layer. However, with the current methods, cutting can destroy, damage, or distort the sample due to its softness and fragility after expansion. In addition, to the extent that a large sample can initially be sliced into multiple pieces that can be individually expanded, not only is this approach more complex and cumbersome, it also does not allow the user to reliably or readily reassemble the connections between different pieces captured in different images. Similarly, to the extent that large expanded hydrogels could be embedded in a mounting block, such as 4% LM agarose, this can result in substantial shrinking and deformation of the hydrogel, precluding reliable reconstruction.

Large expanded samples produced by conventional expansion methods are therefore not readily amenable to processing and high resolution imaging by current microscope systems, objectives that are particularly desirable for neuroscience applications.

The investigations here address these and other limitations by describing formulations and methods to improve the rigidity, stability, and properties of biological samples after expansion. These improvements include incorporating low melting (LM) agarose in the expansion step. LM agarose has a lower melting and gelling temperature compared to standard agaroses. It also has a high clarity, allowing expanded samples to attain a refractive index essentially equivalent to water. With these improvements, samples can be moved more quickly during image acquisition. Moreover, such samples can be sliced and scanned without compromising their physical integrity, allowing the reconstruction of samples, such as whole brains, that are much larger in size than those adaptable to other expansion approaches. These improvements also include more efficient and rapid staining methods for dyes (and other reagents) that can readily be integrated in the protocols described here.

Materials and Methods

Animal Handling and Perfusion

Adult or young wildtype mice were housed in cages with unrestricted access to food and water. All experimental procedures were performed in compliance with protocols approved by the National Tsing Hua University animal care and use committee. Mice were deeply anesthetized with pentobarbital, transcardially perfused with PBS (pH 7.4) to flush out blood vessels, and then fixed by perfusion with 4% paraformaldehyde (PFA) in PBS (pH 7.4). Following PFA perfusion, organs were carefully removed and post-fixed in the same fixation solution overnight at 4° C. The fixed organs were then washed with PBS and stored in 40% sucrose in PBS at 4° C. until needed.

Hydrogel Embedding

Fixed samples were pre-incubated in freshly prepared gelling solution (including acrylamide (AA), sodium acrylate (SA), N,N'-Methylenebisacrylamide (BA), NaCl in 1×PBS, and VA-044) for at least 24 hours at 4° C., as described further in Table 1. Following pre-incubation, each specimen was transferred to a tube with fresh gelling solution on ice (prepared as above and degassed) and the initiator VA-044 was added to the solution. Polymerization was then performed by incubating the tube at 37° C. for 2 hours in a second, larger, humidified container (to prevent liquid loss that might otherwise cause sample shrinkage)

Denaturation

Following polymerization, the hydrogel embedded samples were subject to homogenization, a step to help ensure uniform swelling of the sample during subsequent expansion. Such homogenization was accomplished by denaturing the sample in a solution containing the detergent SDS. The exact makeup of the SDS solution, temperature, and incubation time varied, depending on the sample, as detailed in Table 1. Kidney, liver, and heart organs were incubated for 2-3 days at 70° C. in a solution containing 200 mM SDS and 50 mM Tris, pH 9.0, with gentle shaking and a solution change each day. Adult (7-day old) mouse brains were incubated for 30 (10) days at 37° C. in a solution containing 8% SDS, 200 mM Boric acid, adjusted to pH 8.5, with gentle shaking and solution changes every 5 days.

Matrix-Assisted Expansion

Denatured samples were washed three times in 1×PBST, each time at 37° C. for 3 hours. Samples were then expanded in water supplemented with low melting (LM) agarose (SeaPlaque™ Agarose, Lonza Catalogue #50104) under the following conditions. Adult mouse brain samples were washed three times in 0.35% LM agarose in ddH$_2$O (agarose water), each time for two hours at 37° C.; followed by 0.5% LM agarose water overnight at 37° C.; and then in 0.35%

LM agarose water for an additional 2 days at 37° C. Other samples were incubated in 0.35% LM agarose water for 2 days at 37° C.

Dye Staining

As applicable, samples were stained with one or more of the dyes directed to subcellular components, as follows: Lectin-488, Lectin-594, and Lectin-649 (Source: Vector, Cat. No. DL-1174, DL-1177, and DL-1178); Target: blood vessel proteins); 4',6-diamidino-2-phenylindole or DAPI (Source: SouthernBiotech, Cat. No. 0100-20, Target: dsDNA); Propidium Iodide (Source: Cayman, Cat. No. 14289, Target: DNA and RNA); and Acridine Orange (Source: Sigma-Aldrich. Cat. No. A8097, Target: DNA, RNA, acid glycosaminoglycans).

Dye staining was combined with the matrix-assisted expansion step by adding the dye directly to the agarose water under the following conditions: Lectin-488, Lectin-568, or Lectin 649: 1:500 in 0.35% LM agarose water at 37° C. for 7 days (adult mouse brain) or 3 days (other organs); DAPI: 1:1000 in 0.35% LM agarose water at 37° C. for 7 days (adult mouse brain) or 3 days (other organs); Propidium Iodide (PI): 1:1000 in 0.35% LM agarose water at 37° C. for 7 days (adult mouse brain) or 3 days (other organs); Acridine Orange: 1:5000 in 0.35% LM agarose water at 37° C. for 3 days (adult mouse brain).

Following expansions, samples were imaged, or alternatively, stored for up to three months in the agarose water at 37° C. Dye staining was verified for up to month of storage, e.g., signal can be detected. Prior to imaging, the samples were them incubated in distilled water to remove excess agarose from the sample.

Antibody Staining

As applicable, samples were incubated with one or more antibodies directed to specific proteins, as follows: Tyrosine Hydroxylase (Source: Sigma-Aldrich, Cat. No. AB152, rabbit polyclonal antibody); Neuronal Nuclear Antigen (NeuN) (Source: Abcam, Cat. No. ab190195, rabbit recombinant monoclonal antibody); Na+K+Cl— Cotransporter 2 (NKCC2) (Source: Sigma-Aldrich, Cat. No. AB2281, rabbit polyclonal antibody) Immunostaining was carried out at different stages, for example, following the gelling stage—but before denaturation, or alternatively, after denaturing and prior to expansion. Successful antibody staining was observed for 7-day old mouse kidney samples with anti-NKCC2 and anti-AQP-I antibodies, both pre-expansion and after SDS denaturation.

Mounting and Imaging

For mounting, a few drops of melted 2% LM agarose were applied to the imaging holder, the expanded sample was attached to the holder, and the agarose was allowed to air dry. The expanded samples were then imaged by Light-Sheet Fluorescence Microscopy (LSFM) using a non-diffracting Bessel beam.

Results and Discussion

Table 1 summarizes experimental conditions for matrix assisted expansion of large intact mouse organs for super resolution imaging by expansion microscopy.

TABLE 1

Figure 2:
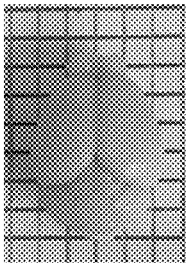
FIG. 2 is a photograph of a fixed adult mouse brain prior to processing and after expansion, in accordance with a matrix-assisted protocol described in this application. Each square in the grid is 2.5 mm by 2.5 mm Individual steps were carried out as described in Example 1 and Table 1.
Figure 2:
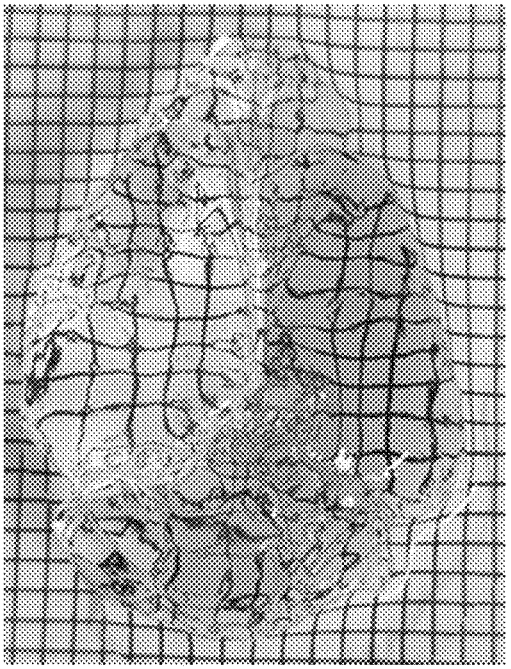
Figure 3:
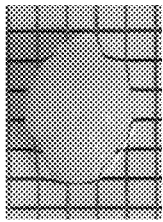
FIG. 3 is a photograph of a 7-day-old fixed mouse brain prior to processing and after expansion, in accordance with a matrix-assisted protocol described in this application. Each square in the grid is 2.5 mm by 2.5 mm Individual steps were carried out as described in Example 1 and Table 1.
Figure 3:
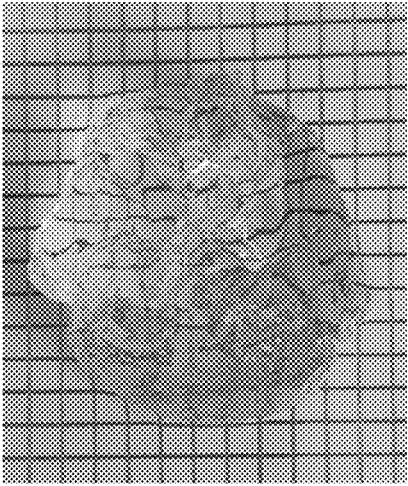
Figure 4:
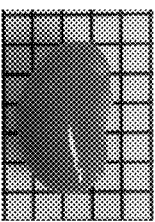
FIG. 4 is a photograph of a fixed adult mouse kidney prior to processing and after expansion, in accordance with a matrix-assisted protocol described in this application. Each square in the grid is 2.5 mm by 2.5 mm Individual steps were carried out as described in Example 1 and Table 1.
Figure 4:
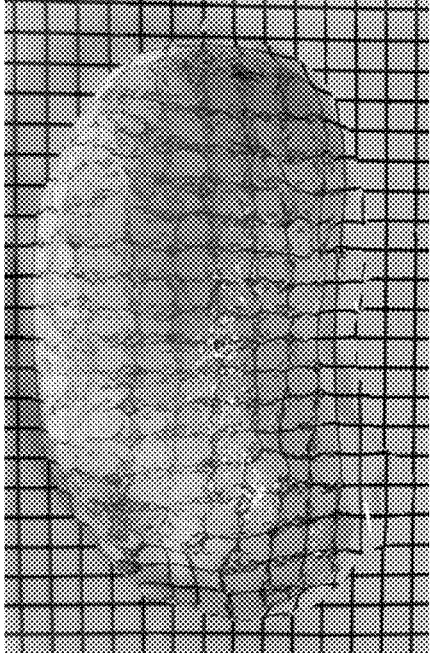
Figure 5:
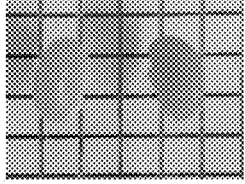
FIG. 5 is a photograph of 7-day-old fixed mouse kidneys prior to processing and after expansion, in accordance with a matrix-assisted protocol described in this application. Each square in the grid is 2.5 mm by 2.5 mm Individual steps were carried out as described in Example 1 and Table 1.
Figure 5:
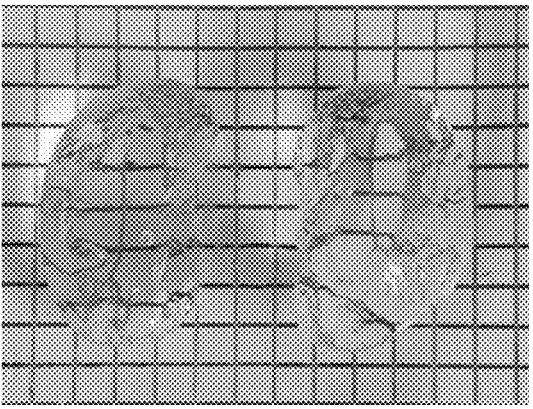
Figure 6:
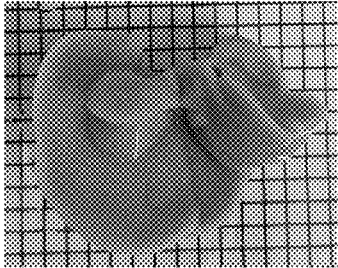
FIG. 6 is a photograph of a fixed adult mouse liver prior to processing and a sample of the liver after expansion, in accordance with a matrix-assisted protocol described in this application. Each square in the grid is 2.5 mm by 2.5 mm Individual steps were carried out as described in Example 1 and Table 1.
Figure 6:
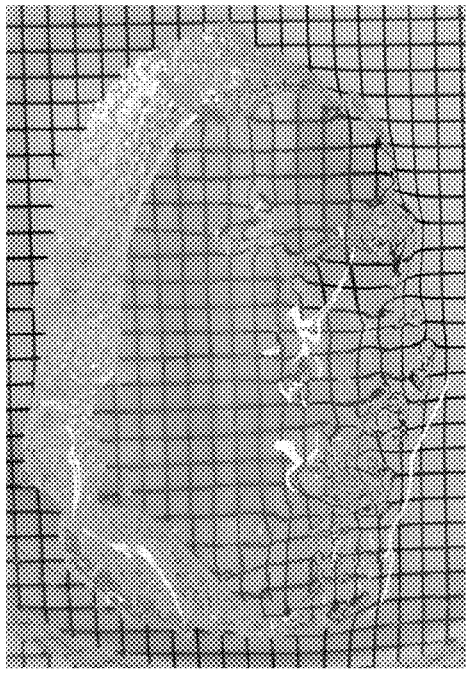
Figure 7:
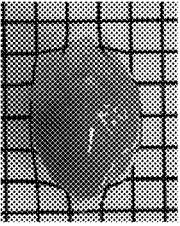
FIG. 7 is a photograph of a fixed adult mouse heart prior to processing and after expansion, in accordance with a matrix-assisted protocol described in this application. Each square in the grid is 2.5 mm by 2.5 mm Individual steps were carried out as described in Example 1 and Table 1.
Figure 7:
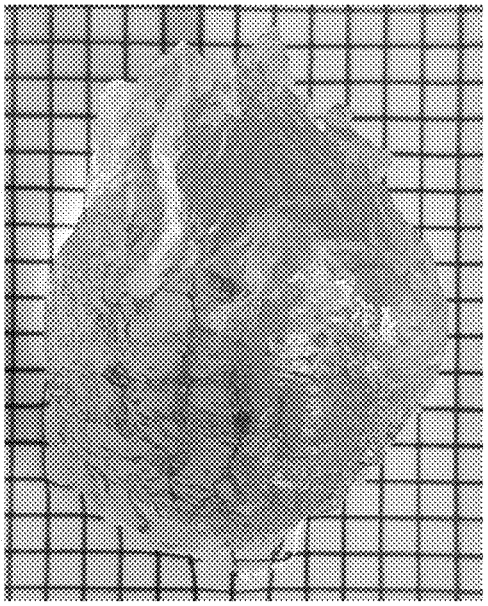

| | Experimental Conditions | | | |
|---|---|---|---|---|
| Organ Type | Gelling Preincubation | Denaturation | Agarose Water Wash and Expansion | Dye Staining |
| Adult Mouse Brain (FIG. 2) (FIG. 13) | 2 days; 4° C. | 8% SDS, 200 nM Boric acid, pH 8.5 (adjusted with NaOH); 30 days; 37° C. | 0.35% LM agarose water for 2 h (3X), then 0.5% LM agarose water overnight, followed by 0.35% LM agarose water for additional 2 days, 37° C. | Lectin 488, 568, 649, 1:500 in agarose water, 7 days, 37° C. PI, 1:1000 in agarose water, 7 days, 37° C. DAPI, 1:1000 in agarose water, 7 days, 37° C. Acridine Orange, 1:5000 in agarose water, 3 days, 37° C. |
| 7-Day Old Mouse Brain (FIG. 3) | 1 day; 4° C. | 8% SDS, 200 nM Boric acid, pH 8.5 (adjusted with NaOH); 10 days, 37° C. | 0.35% LM agarose water, 2 days, 37° C. | Lectin 488, 568, 649, 1:500 in agarose water, 3 days, 37° C. PI, 1:1000 in agarose water, 3 days; 37° C. DAPI, 1:1000 in agarose water, 3 days, 37° C. |
| Adult Mouse Kidney (FIG. 4) | 1 day; 4° C. | 200 mM SDS, 50 mM Tris, pH 9.0; 3 days; 70° C. | 0.35% LM agarose water, 2 days, 37° C. | Lectin 488, 568, 649, 1:500 in agarose water, 3 days, 37° C. PI, 1:1000 in agarose water, 3 days, 37° C. DAPI, 1:1000 in agarose water, 3 days, 37° C. |
| 7-Day Old Mouse Kidney (FIG. 5) (FIG. 14) (FIG. 15) (FIG. 16) | 1 day; 4° C. | 200 mM SDS, 50 mM Tris, pH 9.0; 2 days; 70° C. | 0.35% agarose water, 2 days, 37° C. | Lectin 488, 568, 649, 1:500 in agarose water, 3 days, 37° C. PI, 1:1000 in agarose water, 3 days, 37° C. DAPI, 1:1000 in agarose water, 3 days, 37° C. |
| Adult Mouse Liver (FIG. 6) | 2 days; 4° C. | 200 mM SDS, 50 mM Tris, pH 9.0; 3 days; 70° C. | 0.35% LM agarose water, 2 days, 37° C. | PI, 1:1000 in agarose water, 3 days, 37° C. DAPI, 1:1000 in agarose water, 3 days, 37° C. |
| Adult Mouse Heart (FIG. 7) | 1 day; 4° C. | 200 mM SDS, 50 mM Tris, pH 9.0; 2 days; 70° C. | 0.35% agarose water, 2 days, 37° C. | PI, 1:1000 in agarose water, 3 days, 37° C. DAPI, 1:1000 in agarose water, 3 days, 37° C. |

TABLE 1-continued

Figure 8:
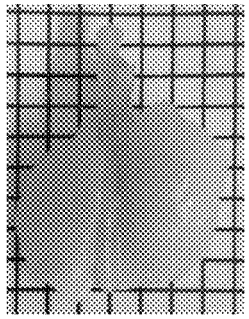
FIG. 8 is a photograph of fixed adult mouse lungs prior to processing and after expansion of the left lung, in accordance with a matrix-assisted protocol described in this application. Each square in the grid is 2.5 mm by 2.5 mm Individual steps were carried out as described in Example 1 and Table 1.
Figure 8:
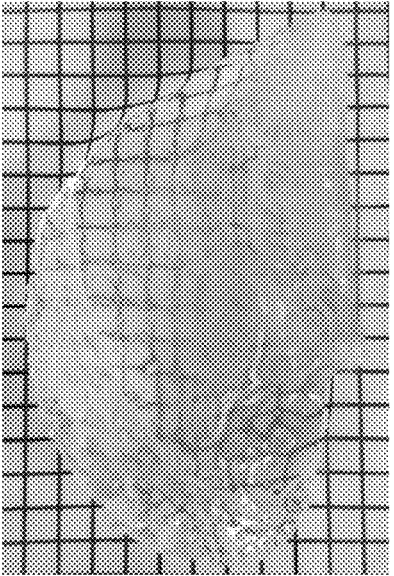
Figure 9:
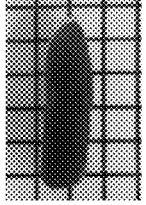
FIG. 9 is a photograph of a fixed adult mouse spleen prior to processing and after expansion, in accordance with a matrix-assisted protocol described in this application. Each square in the grid is 2.5 mm by 2.5 mm Individual steps were carried out as described in Example 1 and Table 1.
Figure 9:
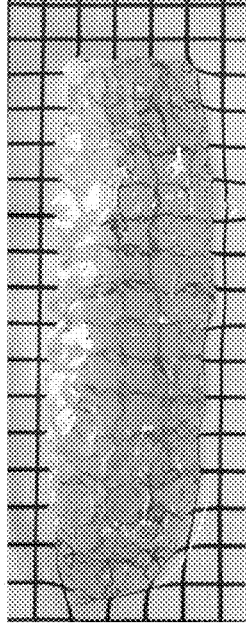
Figure 10:
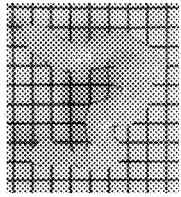
FIG. 10 is a photograph of fixed adult mouse small intestines prior to processing and after expansion, in accordance with a matrix-assisted protocol described in this application. Each square in the grid is 2.5 mm by 2.5 mm Individual steps were carried out as described in Example 1 and Table 1.
Figure 10:
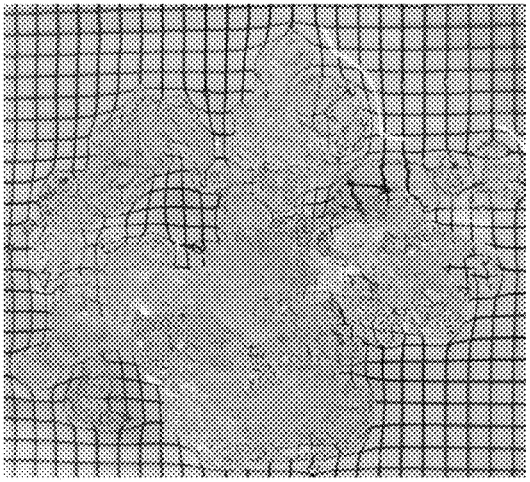
Figure 11:
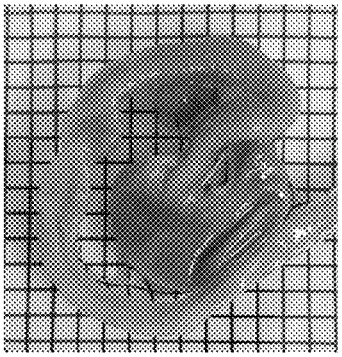
FIG. 11 is a photograph of fixed adult mouse large intestines prior to processing and a segment of the large intestines after expansion, in accordance with a matrix-assisted protocol described in this application. Each square in the grid is 2.5 mm by 2.5 mm Individual steps were carried out as described in Example 1 and Table 1.
Figure 11:
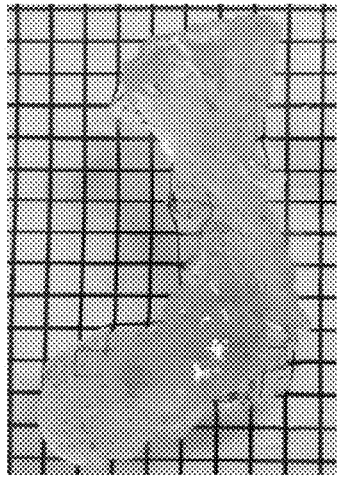
Figure 12:
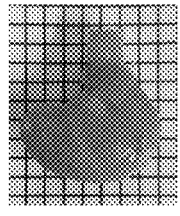
FIG. 12 is a photograph of a fixed adult mouse stomach prior to processing and after expansion, in accordance with a matrix-assisted protocol described in this application. Each square in the grid is 2.5 mm by 2.5 mm Individual steps were carried out as described in Example 1 and Table 1.
Figure 12:
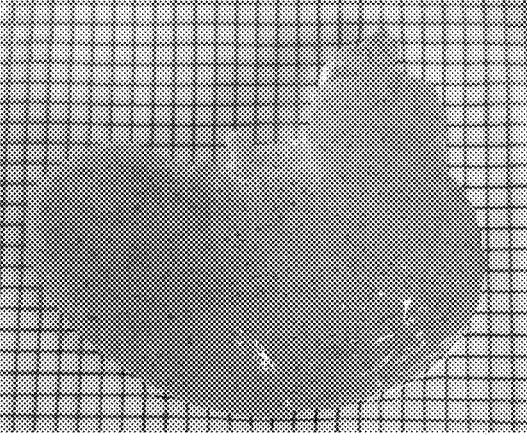

| Organ Type | Gelling Preincubation | Denaturation | Agarose Water Wash and Expansion | Dye Staining |
|---|---|---|---|---|
| Adult Mouse Lungs (FIG. 8) | 2 days; 4° C. | 200 mM SDS, 50 mM Tris, pH 9.0; 3 days; 70° C. | 0.35% LM agarose water, 2 days, 37° C. | PI, 1:1000 in agarose water, 3 days, 37° C. |
| Adult Mouse Spleen (FIG. 9) | 2 days; 4° C. | 200 mM SDS, 50 mM Tris, pH 9.0; 3 days; 70° C. | 0.35% LM agarose water, 2 days, 37° C. | Acridine Orange, 1:5000 in agarose water, 3 days, 37° C. |
| Adult Mouse Small Intestines (FIG. 10) | 2 days; 4° C. | 200 mM SDS, 50 mM Tris, pH 9.0; 2 days; 70° C. | 0.35% LM agarose water, 2 days, 37° C. | Acridine Orange, 1:5000 in agarose water, 3 days, 37° C. |
| Adult Mouse Large Intestines (FIG. 11) | 2 days; 4 C | 200 mM SDS, 50 mM Tris, pH 9.0; 2 days; 70° C. | 0.35% LM agarose water, 2 days, 37° C. | Acridine Orange, 1:5000 in agarose water, 3 days, 37° C. |
| Adult Mouse Stomach (FIG. 12) | 2 days; 4° C. | 200 mM SDS, 50 mM Tris, pH 9.0; 3 days; 70° C. | 0.35% LM agarose water, 2 days, 37° C. | Acridine Orange, 1:5000 in agarose water, 3 days, 37° C. |
| Adult mouse brain hippocampus (FIG. 17) | 1 day; 4° C. | 200 mM SDS, 50 mM Tris, pH 9.0; 1 day; 70° C. | 0.35% LM agarose water, 2 days, 37° C. | Lectin 488, 568, 649, 1:500 in agarose water, 3 days, 37° C.; DAPI, 1:1000 in agarose water, 3 days, 37° C. |
| Adult mouse brain hypothalamus (FIG. 18) | 1 day; 4° C. | 200 mM SDS, 50 mM Tris, pH 9.0; 1 day; 70° C. | 0.35% LM agarose water, 2 days, 37° C. | Lectin 488, 568, 649, 1:500 in agarose water, 3 days, 37° C. DAPI, 1:1000 in agarose water, 3 days, 37° C. |

Figure 17:
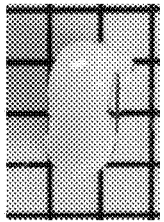
FIG. 17 is a photograph (top panels) of an adult mouse brain hippocampus prior to processing and after expansion, in accordance with a matrix-assisted protocol described in this application. Each square in the grid is 2.5 mm by 2.5 mm. The individual steps were carried out as described in Example 1 and Table 1. The lower panel depicts an image of the expanded hippocampus following staining with a neuronal marker, an anti-NeuN antibody conjugated to Alexa Fluor 488, along with a lectin 649 dye, and imaging by lightsheet microscopy. Scale bar: 1000 um.
Figure 17:
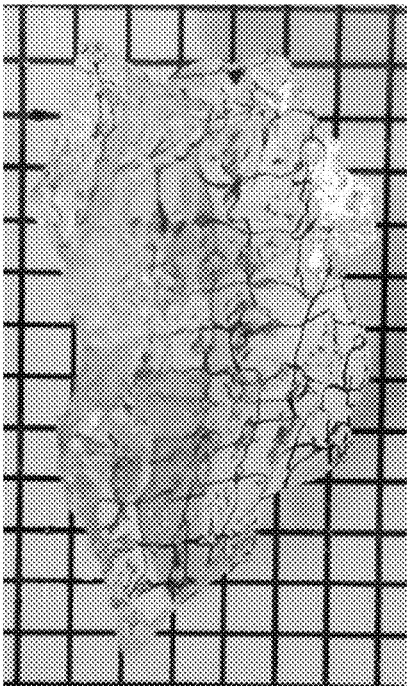
Figure 17:
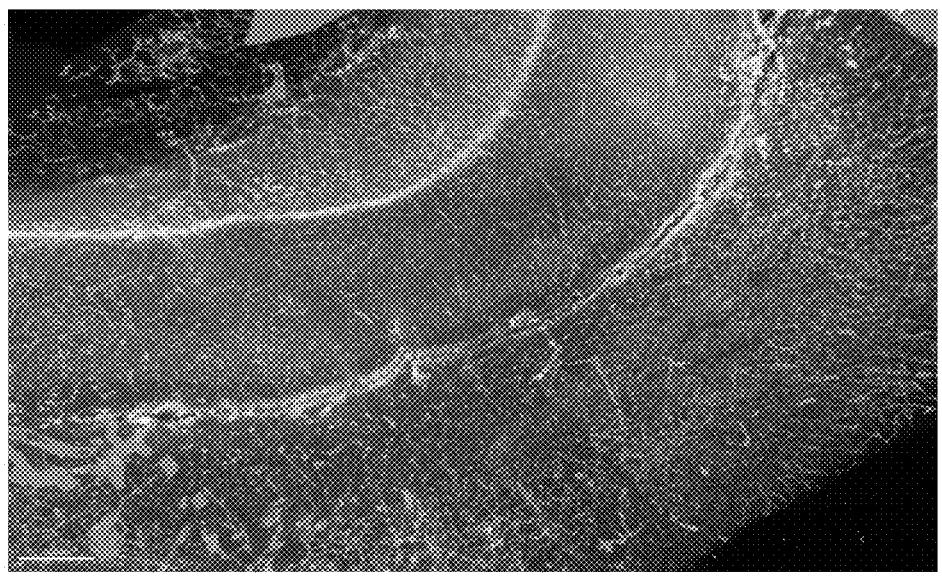
Figure 18:
FIG. 18 is a photograph (top panels) of the adult mouse brain hypothalamus prior to processing and after expansion, in accordance with a matrix-assisted protocol described in this application. Each square in the grid is 2.5 mm by 2.5 mm. The individual steps were carried out as described in Example 1 and Table 1. The lower panel depicts an image taken from a reconstructed expanded hypothalamus following staining with a NeuN_488 antibody and a lectin 649 dye and imaging by lightsheet microscopy. Scale bar: 800 µm.
Figure 18:
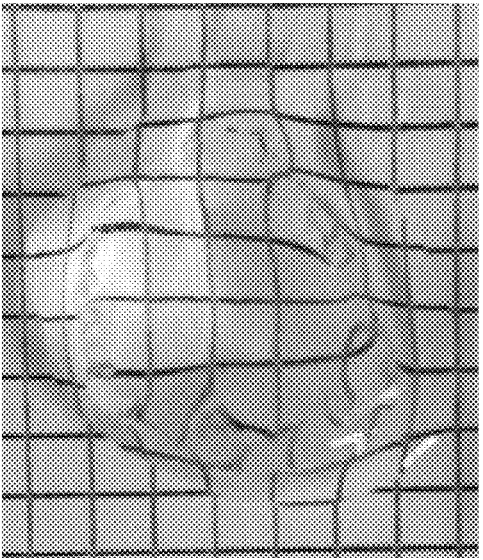
Figure 18:
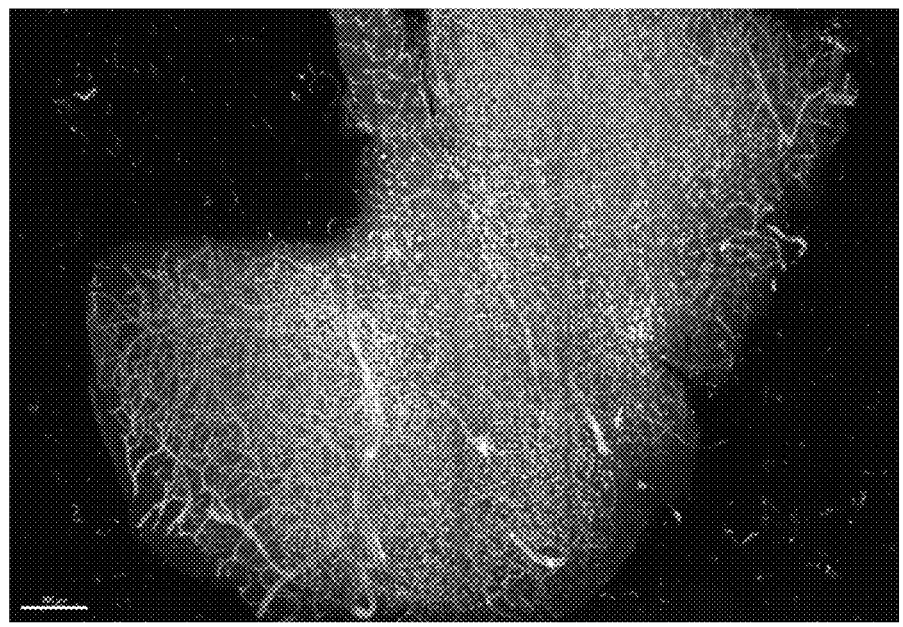

FIGS. 2-13 provide exemplary views of whole mouse organs: (1) before processing (implementation of the protocol) that is, after the samples have been fixed and before the gelling step; and (2) following matrix-assisted expansion. FIGS. 17-18 depict intact brain structures (hippocampus and hippocampus, respectively) before implementation of the protocol and following matrix-assisted expansion.

Expansion was observed in all samples after implementation of the protocol and incubation in the expansion solution. Typically, expansion of at least 4-fold was seen in the presence of LM agarose, corresponding to a volumetric increase of at least 64-fold. At the same time, the presence of LM agarose in the expansion solution (agarose water) allows infiltration of the hydrogel, providing a supportive matrix that can facilitate subsequent processing and imaging. Adding agarose to the expansion solution at concentrations of 0.35% or lower did not affect the final size of the expanded sample, compared to incubation in water alone. While higher concentrations of LM agarose conferred an even stronger supporting matrix, they could also lead to lower degrees of expansion. Thus, different concentrations of LM agarose can be used, depending on the application and desired physical magnification.

The results also indicate that the matrix-assisted processing methods do not introduce a significant background signal. For example, imaging quality was comparable in samples prepared in expansion solutions with and without 0.35% LM agarose. More generally, LM agarose has a high clarity, allowing expanded samples to attain a refractive index essentially equivalent to water. This eliminates the requirement of hydrophilic or hydrophobic RI matching solution (and customized lenses) for imaging—as is required in other methods. At the same time, the expansion protocols here can be applied to whole organs—which currently cannot be easily processed and imaged by other known methods.

Figure 13:
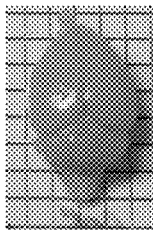
FIG. 13 is a photograph of a fixed adult mouse brain prior to processing and after expansion and staining with acridine orange (diluted 1:1000 in 0.35% LM agarose water at 37° C.). Each square in the grid is 2.5 mm by 2.5 mm.
Figure 13:
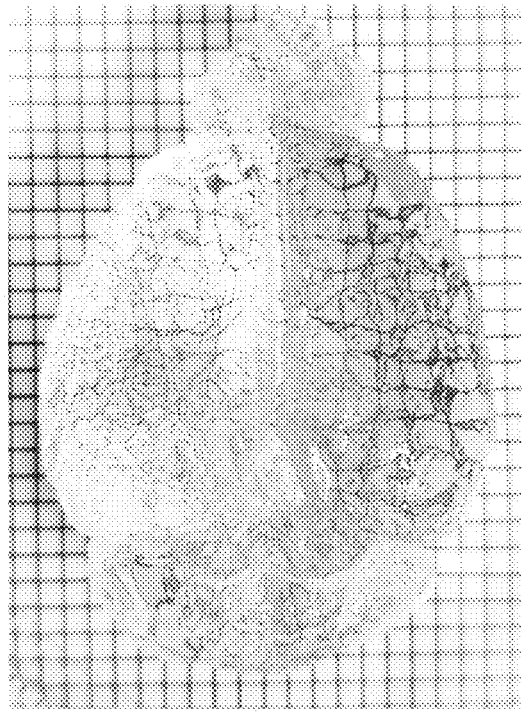
Figure 14:
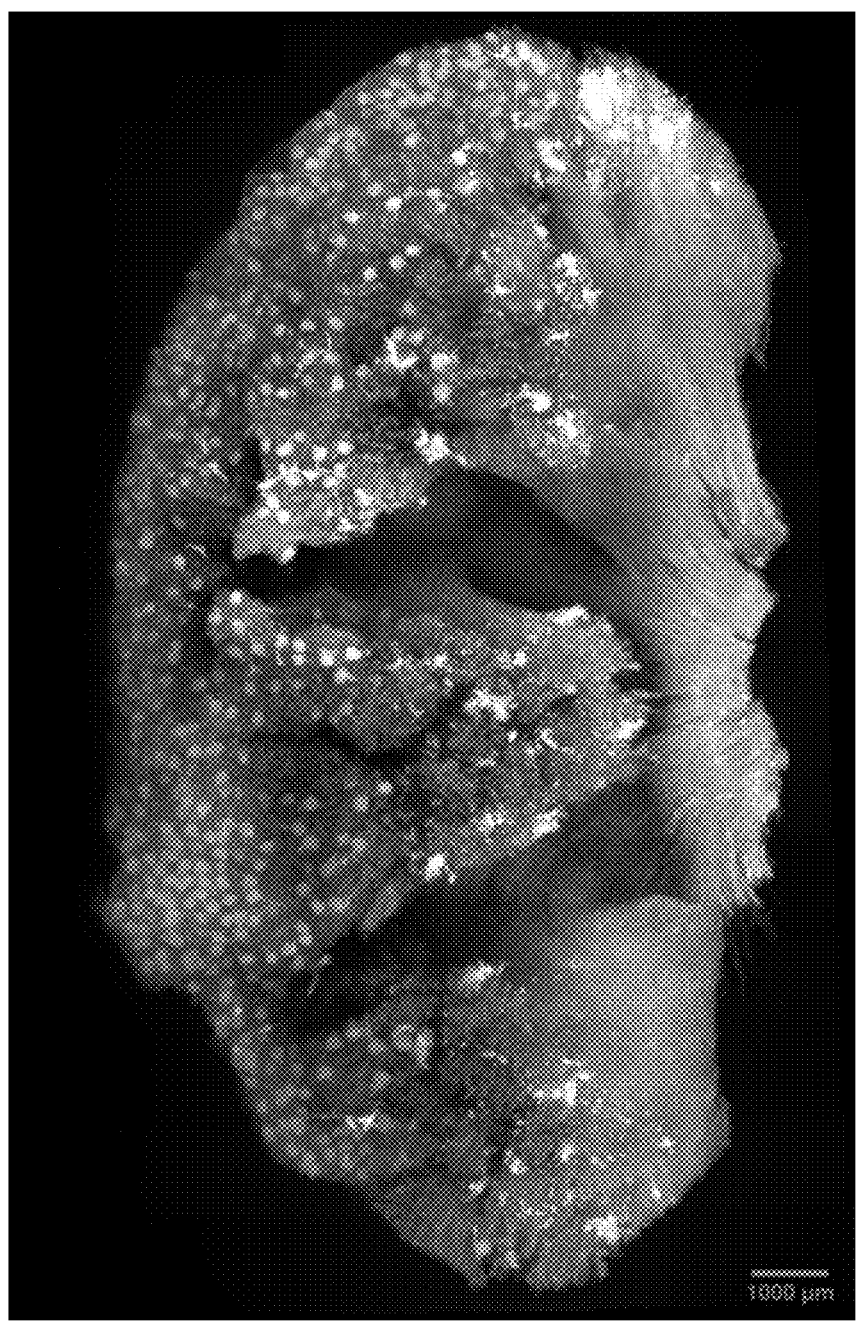
FIG. 14 is an MIP (maximum intensity projection) image of an expanded 7-day old mouse kidney stained with propidium iodine (PI) (diluted 1:1000 in 0.35% LM agarose water at 37° C.). The MIP image was by obtained by scanning Bessel beam light-sheet microscopy of the full Z stack (Z=7 mm). Scale bar: 1000 µm.
Figure 16:
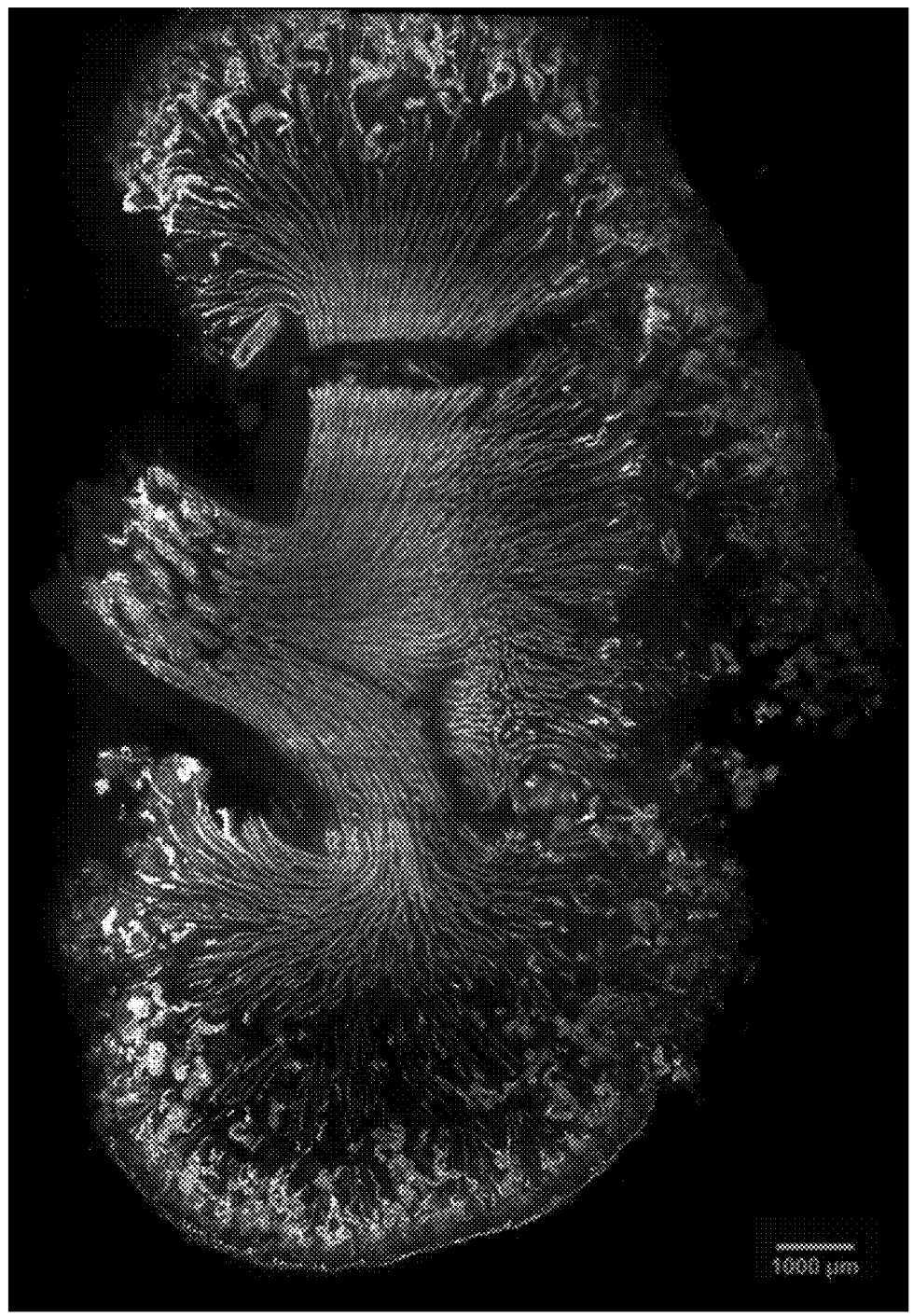
FIG. 16 is an MIP image of an expanded 7-day old mouse kidney stained with Lectin 488. The MIP image was by obtained by scanning Bessel beam light-sheet microscopy of the entire stack (Z=7 mm). Scale bar: 1000 µm.

Robust staining of the expanded samples was observed with a panel of tested dyes, including Lectin-488, Lectin-568, Lectin 649, DAPI, Propidium Iodide, Acridine Orange. FIG. 13 shows an expanded mouse brain stained with acridine orange. FIG. 14 shows an MIP (maximum intensity projection) image of an expanded 7-day old mouse kidney stained with propidium iodine (PI), obtained by scanning Bessel beam light-sheet microscopy of the full Z stack (Z=7 mm). Similarly, FIG. 16 shows an MIP carried out on the full Z stack (Z=7 mm) of an expanded 7-day old mouse kidney stained with Lectin 488, obtained by scanning Bessel beam light-sheet microscopy. Incorporating such dyes directly in the expansion solution therefore allows fast and uniform labeling of large biological specimens, including intact mouse brains (adult and 7-day animals), kidney, liver, heart. Normally, it is very difficult to label large tissues, because of the inability to penetrate deeply into the sample. However, the observations here reveal that this impediment can be effectively addressed by adding dyes during the expansion step, including in the LM agarose-containing expansion solution described here. Without being limited by any specific mechanism, it is believed that when the hydrogel-embedded specimen is immersed in the expansion solution, the water-soluble dyes are carried deep into the tissues by osmotic force facilitated by the highly charged nature of the polyelectrolyte mesh comprising the hydrogel. The protocol therefore enhances the penetration depth of fluorescent dyes, allowing deep labeling of large expanded samples. Combining the staining and expansion steps can also offer the additional advantage of speeding up overall sample processing time.

Figure 15:
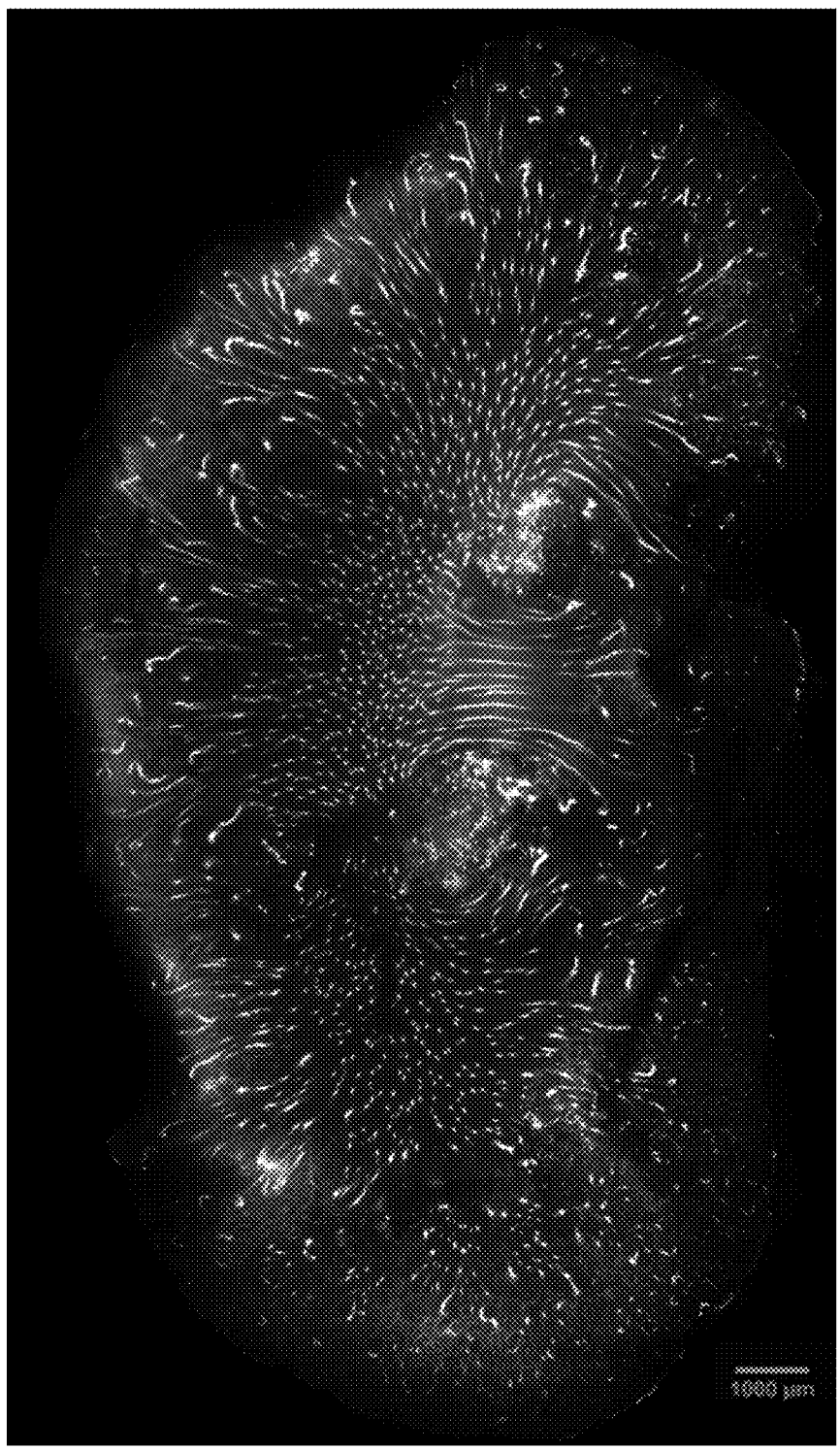
FIG. 15 is an MIP image of an expanded 7-day old mouse kidney incubated with a primary antibody directed to the Na+K+Cl— Cotransporter 2 protein (NKCC2) and visualized with secondary antibody conjugated to Alexa Fluor 488. The MIP image was by obtained by scanning Bessel beam light-sheet microscopy of the entire stack (Z=7 mm). Scale bar: 1000 µm.

A panel of primary antibodies was also evaluated for immunostaining of expanded samples corresponding to isolated organs and brain structures. The presence (or absence) of antibody binding was assessed by subsequent incubation with secondary antibodies conjugated with Alexa Fluor fluorescent dyes, which were found to be stable though the matrix-assisted protocol. FIG. 15 is an MIP image of an expanded 7-day old mouse kidney incubated with a rabbit polyclonal antibody, AB2281 (Sigma-Aldrich), which recognizes the cytoplasmic domain of Na+K+Cl— Cotransporter 2 (NKCC2). NKCC2 is kidney-specific and is found on the apical membrane of the thick ascending limb of Henle's loop and the macula densa. AB2281-binding was detected by secondary antibody conjugated to Alexa Fluor 488 (Invitrogen Donkey anti-Rabbit IgG (H+L) Highly Cross-Adsorbed Secondary Antibody, Alexa Fluor 488, Cat no: A-21206). The MIP image was by obtained by scanning Bessel beam light-sheet microscopy of the entire stack (Z=7 mm). FIG. 17 depicts an image, obtained from a 3D reconstruction, of an expanded hippocampus following immunostaining with a NeuN_488 monoclonal antibody conjugated to Alexa Fluor 488 (Abcam; EPR12763—Neuronal Marker (Alexa Fluor® 488) ab190195) and Lectin-649 dye. FIG. 18 depicts an image, taken from a 3D reconstruction, of an expanded hypothalamus specimen following immunostaining with a NeuN_488 monoclonal antibody conjugated to Alexa Fluor 488 (Abcam; EPR12763—Neuronal Marker (Alexa Fluor® 488) ab190195) and Lectin-649 dye.

FIG. 18 is a photograph (top panel) of the adult mouse brain hypothalamus prior to processing and after expansion, in accordance with a matrix-assisted protocol described in this application. The individual steps were carried out as described in Example 1 and Table 1. The lower panel depicts an image of the expanded hypothalamus following staining with a NeuN_488 antibody and a lectin 649 dye and imaging by lightsheet microscopy.

The matrix-assisted methods described here can therefore increases sample stiffness, stability, and integrity following expansion, thereby reducing issues that can normally compromise subsequent processing and imaging steps—especially for large samples. For example, matrix-assisted support by LM agarose can substantially decrease the time required to achieve high resolution image of large expanded samples by eliminating or reducing the need to refocus the sample—because it wiggles less—as the stage moves. This decrease can be substantial in view of the long scanning times required to completely image large samples. For example, a high resolution image of a 7-day old mouse kidney sample that has been expanded 4-fold (original size: 2.5 mm×5 mm×2 mm; post-expansion size: 10 mm×20 mm×8 mm) can require days of continuous scanning on an automated stage.

In addition to stabilizing the sample, the presence of LM agarose during expansion confers additional advantages, which allow incorporation of additional processing steps and are particularly applicable to large samples. For example, because it has an LM agarose matrix, the expanded hydrogel is compatible with, and can optionally be embedded in, an LM agarose block without shrinking or deforming the sample. (In contrast, when an expanded hydrogel lacking LM agarose is mounted in an LM agarose block, sample deformations are typically observed). In embodiments, LM block embedding offers convenient long-term storage. In embodiments, LM block embedding can facilitate comprehensive image scanning of large samples—for example, those expanding to 1 cm or more along an edge—by allowing them to be sequentially imaged and sliced without destroying the sample. In other words, the protocol is compatible with subsequent a scan and slice imaging approach, in which the user can scan a portion of the embedded organ, then slice away the imaged portion without damaging the remainder of the sample beneath the cutting plane. This has particular applicability to neuroscience, where larger brain tissues can be prepared with the matrix-assisted expansion methods herein, allowing more comprehensive and reliable imaging and mapping of synapses, cells, and neural circuits.

These studies also show that dyes can be directly included in expansion solutions, reducing processing time and allowing for more uniform staining. As the tissue expands, larger molecules can easily penetrate to the center of the tissue. This is in contrast to traditional staining methods of large tissues, which require large amounts of reagents and long incubation times.

More generally, the expansion solution can be implemented in numerous other methods, such as in the processing of samples or biopsies in the evaluation, diagnosis, and monitoring of disease; the processing of samples in the study of normal function of tissues, organs, and cells, including the development, maturation, differentiation, plasticity, and activity of the nervous system; the processing of samples in the screening of candidate therapeutic agents for their effect on a tissue or disease; and the processing of samples to determine the distribution or expression of biomolecules in a whole tissue or intact whole organ, such as a mouse brain.

It will be understood by one skilled in the art that the examples and embodiments described herein do not limit the scope of the invention. The specification, including the examples, is intended to be exemplary only, and it will be apparent to those skilled in the art that various modifications and variations can be made in the present invention without departing from the scope or spirit of the invention as defined by the appended claims.

Furthermore, while certain details in the present disclosure are provided to convey a thorough understanding of the invention as defined by the appended claims, it will be apparent to those skilled in the art that certain embodiments may be practiced without these details. Moreover, in certain instances, well-known methods, procedures, or other specific details have not been described to avoid unnecessarily obscuring aspects of the invention defined by the appended claims.

The invention claimed is:

1. A method of preparing an expanded biological sample, comprising:
   (a) pre-incubating a biological sample that is a cell, tissue or organ in a gelling solution, the gelling solution comprising a hydrogel precursor;
   (b) introducing a polymerization initiator to the gelling solution and polymerizing the gelling solution to embed the biological sample in a hydrogel;
   (c) homogenizing the biological sample embedded in the hydrogel in a denaturing solution to denature the biological sample; and
   (d) incubating the denatured biological sample embedded in the hydrogel in an expansion solution, to expand the biological sample, the expansion solution comprising an aqueous solution of from 0.1% to 1% low melting point (LM) agarose.

2. The method of claim 1, wherein the expansion solution comprises from 0.3% to 0.6% LM agarose.

3. The method of claim 2, wherein in step (d), the denatured biological sample embedded in the hydrogel is incubated in the expansion solution at a temperature of at least 37° C.

4. The method of claim 2, wherein in step (d), the denatured biological sample embedded in the hydrogel is incubated in the expansion solution for at least two days.

5. The method of claim 1, wherein the expansion solution further comprises a dye, label, stain, or combination thereof.

6. The method of claim 5, wherein the dye is a lectin, DAPI, Propidium Iodide, Acridine Orange, or a combination thereof.

7. The method of claim 1, further comprising the step of high resolution imaging of the expanded biological sample by microscopy.

8. The method of claim 7, wherein prior to imaging, the expanded biological sample is transferred to water.

9. The method of claim 8, further comprising mounting the expanded biological sample on an image holder and imaging the mounted expanded biological sample in a water chamber.

10. The method of claim 8, further comprising mounting the expanded biological sample in a low melting point agarose block.

11. The method of claim 10, further comprising imaging a first layer of the low melting point agarose block containing the expanded biological sample, removing said first layer from the low melting point agarose block, and imaging a second layer adjacent to said first layer of the low melting point agarose block.

12. The method of claim 1, wherein the denaturing solution comprises an enzyme or a detergent.

13. The method of claim 1, wherein the biological sample is a rodent organ.

14. The method of claim 1, wherein the biological sample is an organ.

15. The method of claim 14, wherein the organ is a whole organ.

16. The method of claim 14, wherein the organ is a brain.

17. The method of claim 14, wherein the organ is a kidney.

18. The method of claim 14, wherein the organ is a liver.

19. The method of claim 14, wherein the organ is a lung.

20. The method of claim 14, wherein the organ is a spleen.

21. The method of claim 14, wherein the organ is an intestine.

22. The method of claim 14, wherein the organ is a stomach.

23. The method of claim 1, wherein the biological sample is tissue.

24. The method of claim 23, wherein the tissue is brain tissue.

25. The method of claim 24, wherein the brain tissue is hippocampus tissue.

26. The method of claim 24, wherein the brain tissue is hypothalamus tissue.

* * * * *